(12) United States Patent
Eshraghi et al.

(10) Patent No.: US 7,501,008 B2
(45) Date of Patent: Mar. 10, 2009

(54) HYDROGEN STORAGE SYSTEMS AND FUEL CELL SYSTEMS WITH HYDROGEN STORAGE CAPACITY

(75) Inventors: Ray R. Eshraghi, Cary, NC (US);
Michael W. Riley, Morrisville, NC (US);
Jung-Chou Lin, Apex, NC (US)

(73) Assignee: Microcell Corporation, Raleigh, NC (US)

( * ) Notice: Subject to any disclaimer, the term of this patent is extended or adjusted under 35 U.S.C. 154(b) by 467 days.

(21) Appl. No.: 10/767,107

(22) Filed: Jan. 28, 2004

(65) Prior Publication Data

US 2004/0191588 A1    Sep. 30, 2004

Related U.S. Application Data

(60) Provisional application No. 60/443,981, filed on Jan. 31, 2003.

(51) Int. Cl.
*B01D 53/22* (2006.01)
*H01M 8/06* (2006.01)

(52) U.S. Cl. ............................ 95/55; 95/45; 423/648.1; 423/658.2; 502/526; 420/900; 429/19; 96/8

(58) Field of Classification Search ..................... 429/31
See application file for complete search history.

(56) References Cited

U.S. PATENT DOCUMENTS

| | | | |
|---|---|---|---|
| 4,230,463 A * | 10/1980 | Henis et al. ..................... 95/47 |
| 5,181,549 A | 1/1993 | Shapovalov |
| 5,385,263 A | 1/1995 | Kirk et al. |
| 5,876,604 A * | 3/1999 | Nemser et al. ............... 210/634 |
| 5,916,514 A | 6/1999 | Eshraghi |
| 5,928,808 A | 7/1999 | Eshraghi |
| 5,989,300 A | 11/1999 | Eshraghi |
| 6,004,691 A | 12/1999 | Eshraghi |
| 6,080,501 A | 6/2000 | Kelley et al. |
| 6,228,146 B1 * | 5/2001 | Kuespert ....................... 95/46 |

(Continued)

OTHER PUBLICATIONS

Steve C. Amendola et al., *A Safe, Portable, Hydrogen Gas Generator Using Aqueous Borohydride Solution and Ru Catalyst*, International Juranl of Hydrogen Energy, vol. 25, pp. 969-975 (2000).

*Primary Examiner*—Jonathan Crepeau
*Assistant Examiner*—Tony Chuo
(74) *Attorney, Agent, or Firm*—Vincent K. Gustafson; Intellectual Property/Technology Law

(57) ABSTRACT

The present invention relates to a gas storage and dispensing system, which comprising a carrier material for a target gas and multiple microtubular elements in contact with such carrier material. Each microtubular element comprises a tubular wall that defines a bore side and a shell side that are sealed from each other, preferably by one or more potting members. The carrier material is either at the bore sides or at the shell sides of the microtubular elements, and it can be either a solid sorbent material for the target gas, or a liquid carrier therefor. Such gas storage and dispensing system is particular useful for hydrogen storage, when the carrier material can be a hydrogen-sorbent that contains hydrogen gas, or liquefied hydrogen, or an organic hydrogen solution, or a metal hydride solution capable of generating hydrogen gas. Such microtubular elements can further be designed as microfibrous fuel cells, while each microfibrous fuel cell comprises a carrier material at its bore side.

31 Claims, 13 Drawing Sheets

U.S. PATENT DOCUMENTS

| | | |
|---|---|---|
| 6,257,360 B1 | 7/2001 | Wozniak et al. |
| 6,267,926 B1 | 7/2001 | Reed et al. |
| 6,338,913 B1 | 1/2002 | Eshraghi |
| 6,346,350 B1 | 2/2002 | Call et al. |
| 6,358,488 B1 * | 3/2002 | Suda .......................... 423/657 |
| 6,367,647 B1 | 4/2002 | Rudiger et al. |
| 6,399,232 B1 | 6/2002 | Eshraghi |
| 6,403,248 B1 | 6/2002 | Eshraghi |
| 6,403,517 B1 | 6/2002 | Eshraghi |
| 6,432,176 B1 | 8/2002 | Klos et al. |
| 6,444,339 B1 | 9/2002 | Eshraghi |
| 6,468,694 B1 | 10/2002 | Amendola |
| 6,495,281 B1 | 12/2002 | Eshraghi |
| 6,534,033 B1 * | 3/2003 | Amendola et al. ........ 423/648.1 |
| 6,572,837 B1 * | 6/2003 | Holland et al. ........... 423/648.1 |
| 2001/0045364 A1 * | 11/2001 | Hockaday et al. ........... 205/338 |
| 2002/0056370 A1 * | 5/2002 | Masada et al. .................... 96/8 |
| 2002/0069929 A1 * | 6/2002 | Shapovalov et al. ............ 141/4 |
| 2002/0083643 A1 | 7/2002 | Amendola et al. |
| 2002/0106501 A1 | 8/2002 | Debe |
| 2002/0146624 A1 | 10/2002 | Goto et al. |
| 2003/0031907 A1 * | 2/2003 | Gottesfeld ................... 429/30 |
| 2004/0005498 A1 | 1/2004 | Eshraghi |
| 2004/0058224 A1 | 3/2004 | Eshraghi et al. |

* cited by examiner

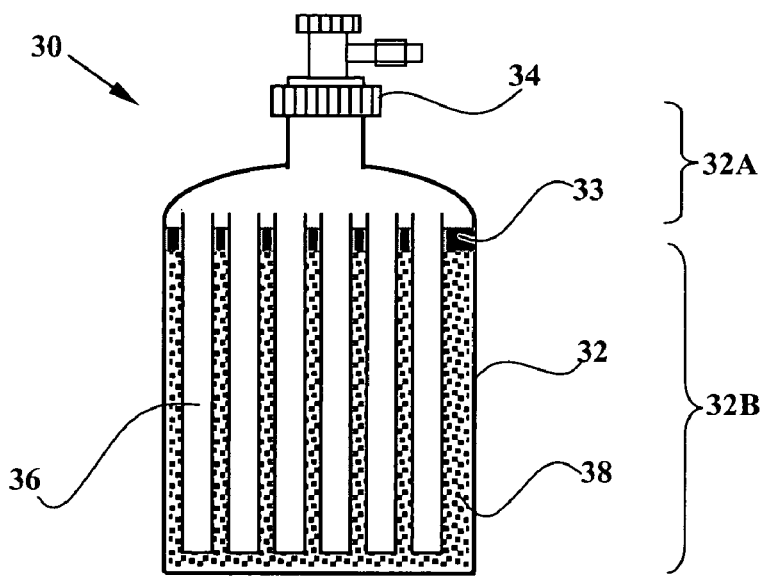
Figure 3A
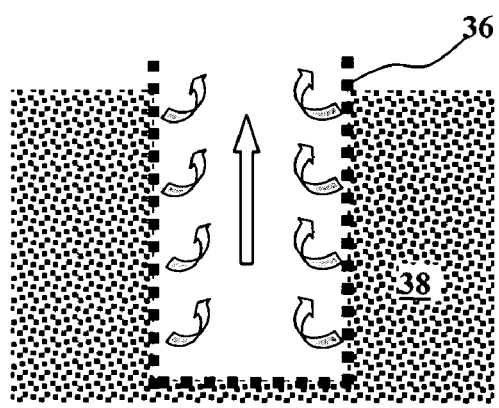 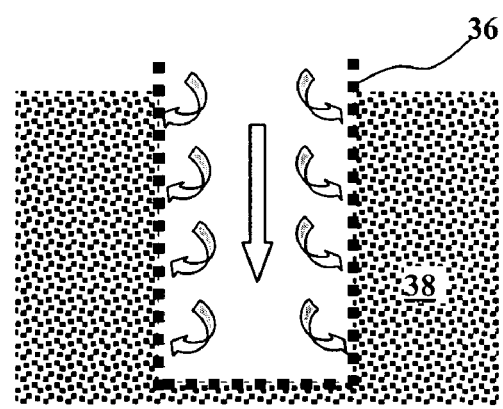
Figure 3B        Figure 3C

US 7,501,008 B2

HYDROGEN STORAGE SYSTEMS AND FUEL CELL SYSTEMS WITH HYDROGEN STORAGE CAPACITY

CROSS-REFERENCE TO RELATED APPLICATIONS

This claims priority to U.S. Provisional Patent Application No. 60/443,981, filed on Jan. 31, 2003 in the names of Ray R. Eshraghi et al. for "HYDROGEN STORAGE SYSTEMS AND FUEL CELL SYSTEMS WITH HYDROGEN STORAGE CAPACITY."

BACKGROUND OF THE INVENTION

1. Field of the Invention

The present invention relates to gas storage and dispensing systems in general, and more specifically to hydrogen storage systems and fuel cell systems with hydrogen storage capacity.

2. Description of the Related Art

Safe, capacious, and convenient storage for various industrial gases is an important aspect common for many industrial operations. When such gases are explosive, toxic, or otherwise environmentally hazardous, the costs for storing and transporting such gases will significantly increase, causing the overall operational costs to rise correspondingly. Even with increased costs, the safety of such storage and transportation is still not guaranteed, and gas leakage/burst due to equipment malfunction or system failure is not infrequent, imposing great danger to the life and health of those persons living or working in the vicinity of such gas leakage/burst sites.

The most common gas storage method is high-pressure (2000-3500 psi) storage in steel gas cylinders. There are many types of high-pressure gas storage cylinders, which contain toxic and other hazardous gases or liquefied gases. These high-pressure gas storage cylinders fill and empty quickly without complications. However, use of such high-pressure gas storage cylinders is significantly limited, due to the danger of explosively rapid release of gas in case of leaking. Moreover, the high-pressure gas storage cylinders have to be built with thick, heavy steel cylinder walls for enduring the high interior gas pressure as well as for ensuring safety against impact, puncture, or crushing damage. The heavyweight cylinder walls significantly limit the overall mass fraction storage capacity of such high-pressure gas cylinders.

Another commonly used gas storage method is liquefied gas storage at very low temperatures. Cryogenic storage, however, consumes a large amount of energy, and the liquefied gas is also not safe or practical for most consumer applications.

Other methods for gas storage include the use of physical or chemical sorbent materials for reversibly adsorbing and releasing the stored gas, which does not require application of high pressure or low temperature. However, the gas storage capacity of such physical or chemical sorbent materials is usually very limited, and the actual working capacity of such sorbent material (i.e., the actual amount of stored gas that is recoverable through desorption) is further limited by large amount of gas sorbate that is trapped in the sorbent bed and becomes irrecoverable. Moreover, the adsorption and desorption speed of the stored gas is significantly limited by diffusion rate of such gas through the sorbent materials, and complicated thermal or pressure equipment is required for enhancing the adsorption/desorption speed.

It is therefore an object of the present invention to provide a gas storage system with enhanced gas storage capacity, reduced storage/transportation cost, and reduced risk of leakage/rupture in comparison with the conventional gas storage methods as described hereinabove.

Hydrogen gas is recognized as an environmentally desirable clean fuel of the future, since the conversion of chemical energy in hydrogen into electrical energy by fuel cells only generates heat and water as end products in a clean and quiet manner with little or no undesirable environmental impact.

Using hydrogen gas as a fuel, however, presents a challenge for the development of hydrogen-fueled vehicles and hydrogen-based energy generation systems. Although hydrogen is extremely energy rich on a weight basis, it is relatively energy poor on a volumetric basis, in comparison with gasoline, and large volumes of hydrogen gas must be safely stored and transported for providing fuel to vehicles and for generating electrical energy for industrial usage. Currently, efficient, low cost, safe, onboard hydrogen storage and transportation systems are still not available.

It is therefore another object of the present invention to provide an efficient and safe hydrogen storage system with enhanced gas storage capacity and reduced cost.

Further, U.S. Pat. Nos. 5,916,514; 5,928,808; 5,989,300; 6,004,691; 6,338,913; 6,399,232; 6,403,248; 6,403,517; 6,444,339; and 6,495,281, all to Ray R. Eshraghi, describe a microcell technology, which relates to microfibrous electrochemical cell structure comprising hollow fiber structures with which electrochemical cell components are associated.

The aforementioned Eshraghi patents specifically describe a microfibrous fuel cell, which has an inner current collector, a hollow fibrous membrane separator containing an electrolyte medium, an outer current collector, and an inner and outer electrocatalyst layer on the inner and outer surface of the membrane separator. One embodiment of such microfibrous fuel cell is a hydrogen-based fuel cell, wherein hydrogen gas is supplied at one side of the hollow fibrous membrane separator, and oxidant is supplied at the other side of the hollow fibrous membrane separator, so that the chemical energy stored in hydrogen gas is converted into electrical energy, generating water and heat as by-products.

Such hydrogen-based microfibrous fuel cell as described in the Eshraghi patents depends on an external hydrogen source for providing the hydrogen gas needed.

It is therefore a further object of the present invention to provide an improved hydrogen-based microfibrous fuel cell with hydrogen storage capacity, which can be used to generate electrical energy independent of any external hydrogen source. Such self-sufficient, independent, microfibrous fuel cell is ideal for supplying electrical energy to various small-size mobile devices such as cell phones, laptop computers, personal digital assistant (PDA), etc.

Other objects and advantages of the present invention will be more fully apparent from the ensuing disclosure and appended claims.

SUMMARY OF THE INVENTION

The present invention in one aspect relates to a storage and dispensing system for storing and dispensing a target gas. Such storage and dispensing system comprises:

(a) a housing;
(b) a plurality of microtubular elements disposed in such housing, wherein each of the microtubular elements comprises a tubular wall defining a bore side and a shell side, and wherein the bore side of each of the microtubular elements is sealed from the shell side thereof; and (c) a carrier material for the target gas, wherein such carrier material is disposed in the housing and at either the bore sides or the shell sides of the microtubular elements.

As used herein, the term "microtubular" refers to a tubular structure having a cross-sectional outer diameter in a range of from about 10 micron to about 10 millimeter. Preferably, the cross-sectional outer diameter of the microtubular elements of the present invention is in a range of from about 10 micron to about 5 millimeter, and more preferably from about 10 micron to about 1 millimeter.

In a preferred embodiment of the present invention, the carrier material is disposed at the bore sides of the microtubular elements. In an alternative embodiment of the present invention, the carrier material is disposed at the shell sides of the microtubular elements. Such carrier material comprises either a solid sorbent material having sorptive affinity for the target gas, or a liquid carrier material that dissolves or otherwise carries such target gas.

In a particularly preferred embodiment of the present invention, the target gas for such storage and dispensing system is hydrogen, and the carrier material comprises a liquid hydrogen carrier that is disposed at the shell sides of the microtubular elements. Such liquid hydrogen carrier comprises a material selected from the group consisting of liquefied hydrogen, organic hydrogen solvents, and metal hydride solutions. The microtubular elements of such hydrogen storage and dispensing system are potted at one or more ends by one or more potting members, sealing the bore sides of such microtubular elements from the shell sides thereof in a leak-tight manner. The potting members and the housing of such hydrogen storage and dispensing system define: (1) at least one liquid compartment for holding the liquid hydrogen carrier, and (2) at least one hydrogen collection compartment separated from the liquid compartment in a leak-tight manner. The microtubular elements extend from the liquid compartment to the hydrogen collection compartment, with the bore sides partially contacting the liquid compartment and the shell sides in fluid communication with the hydrogen collection compartment, so that hydrogen generated by the liquid hydrogen carrier in the liquid compartment can flow through the tubular walls of such microtubular elements into the hydrogen collection compartment.

Another aspect of the present invention relates to a hydrogen generation catalyst structure, comprising an immobilized hydrogen generation catalyst material and a plurality of microtubular elements in contact therewith, wherein each of the microtubular elements comprises a tubular wall defining a bore side and a shell side, and wherein the bore side of each microtubular element is sealed from the shell side thereof. The hydrogen generation catalyst material is either impregnated in the tubular walls of the microtubular elements, or disposed at the bore sides thereof, so that a metal hydride solution can be passed from the bore sides of the microtubular elements through the tubular walls to the shell sides thereof, so as to contact the immobilized hydrogen generation catalyst material and to generate hydrogen.

Such hydrogen generation catalyst structure preferably comprises a housing in which the microtubular elements and the hydrogen generation catalyst material are disposed. The microtubular elements are potted at one or more ends by one or more potting members, so that the bore sides of the microtubular elements are sealed from the shell sides thereof by such potting members in a leak-tight manner. Such potting members and the housing together define a first and a second liquid compartments separated from each other in a leak-tight manner. The microtubular elements extend from the first liquid compartment to the second liquid compartment, with the bore sides in fluid communication with the first liquid compartment and the shell sides in fluid communication with the second liquid compartment, so that fluid flows between the first and the second liquid compartments through the tubular walls of the microtubular elements.

One of the first and the second liquid compartments preferably is connected to a fluid inlet for introducing a metal hydride solution, and the other is connected to a fluid outlet for discharging such metal hydride solution, so that the metal hydride solution is passed from one liquid compartment to the other through the tubular walls of the microtubular elements, during which such metal hydride solution is brought into contact with the hydrogen generation catalyst material for hydrogen generation. Preferably, such metal hydride solution flows from the bore sides of the microtubular elements to the shell sides thereof, and from the first liquid compartment to the second.

A still further aspect of the present invention relates to a microfibrous fuel cell structure, comprising:

a hollow fibrous membrane separator defining a shell side and a bore side;

an inner current collector at the bore side of the hollow fibrous membrane separator;

an inner electrocatalyst layer at the bore side of the hollow fibrous membrane separator;

an outer current collector at the shell side of the hollow fibrous membrane separator;

an outer electrocatalyst layer at the shell side of the hollow fibrous membrane separator; and a hydrogen supply structure at the bore side of the hollow fibrous membrane separator, which comprises a carrier material for hydrogen gas.

The carrier material can be either a solid hydrogen-sorbent material, or a liquid hydrogen carrier. Preferably, the hydrogen supply structure further comprises a tubular membrane that encloses the carrier material and separates the same from the inner current collector and the inner electrocatalyst layer at the bore side of such hollow fibrous membrane separator.

Other aspects, features and advantages of the invention will be more fully apparent from the ensuing disclosure and appended claims.

BRIEF DESCRIPTION OF THE DRAWINGS

FIG. 3A shows a gas storage system comprising multiple microtubular elements and a sorbent material disposed at the shell sides of such microtubular elements, according to one embodiment of the present invention.

FIGS. 3B and 3C are schematic depictions of ingress and egress of gas to and from the sorbent material of FIG. 2A, through an individual microtubular element.

DETAILED DESCRIPTION OF THE INVENTION, AND PREFERRED EMBODIMENTS THEREOF

The disclosures of Eshraghi U.S. Pat. Nos. 5,916,514; 5,928,808; 5,989,300; 6,004,691; 6,338,913; 6,399,232; 6,403,248; 6,403,517; 6,444,339; and 6,495,281 hereby are incorporated herein by reference, in their respective entireties and for all purposes.

The present invention provides a novel gas storage and dispensing system for a target gas, which is characterized by a plurality of microtubular elements. The cross-sectional outer diameter (OD) of each microtubular element ranges from about 10 micron to about 10 millimeter, preferably from about 10 micron to about 5 millimeter, and more preferably from about 10 micron to about 1 millimeter.

Figure 1:
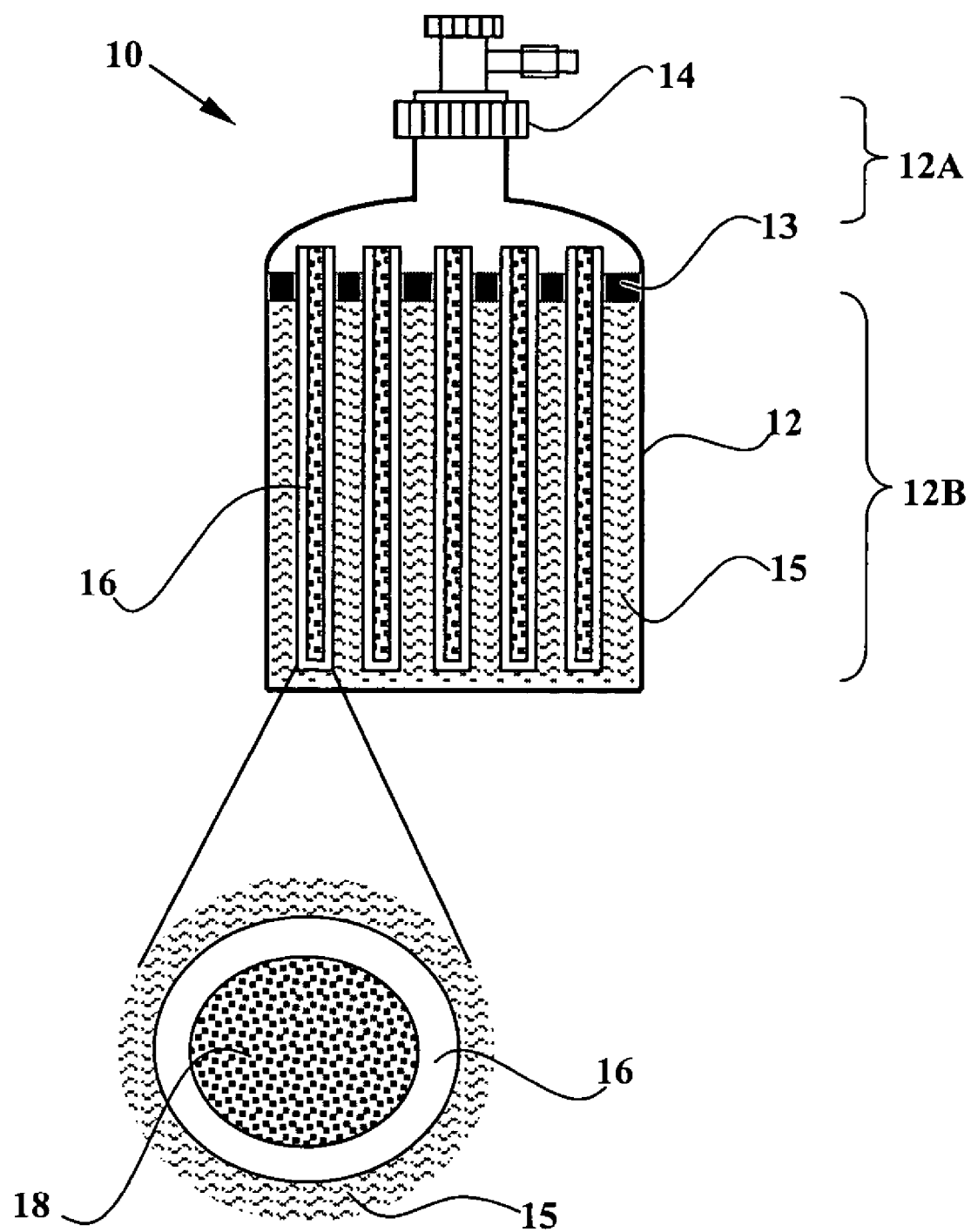
FIG. 1 shows a gas storage system comprising multiple microtubular elements and a sorbent material disposed at the bore sides of the microtubular elements, according to one embodiment of the present invention.

FIG. 1 shows a gas storage and dispensing system comprising multiple such microtubular elements, according to one embodiment of the present invention.

Specifically, the gas storage and dispensing system 10 of FIG. 1 comprises a housing 12, in which the multiple microtubular elements 16 are disposed. Each microtubular element 16 comprises a gas-impermeable tubular wall, which defines a bore side and a shell side. A sorbent material 18 having sorptive affinity for a target gas is disposed at the bore side of each of the multiple microtubular elements 16, so that target gas is absorbed and/or adsorbed by such sorbent material 18 and therefore stored inside the microtubular elements 16, which can be desorbed and dispensed from the housing 12 through a valve head 14.

The bore sides and the shell sides of such microtubular elements 16 are sealed from each other, so that the target gas stored in the sorbent material 18 at the bore sides of the microtubular elements cannot enter the shell sides thereof, leaving the interstices between the microtubular elements at the shell sides free of the target gas. In such manner, the gas storage and dispensing system 10 can be partially pressurized at the bore sides of the microtubular elements, for increasing gas storage capacity of such system, while the shell sides of the microtubular elements are kept at atmospheric or low pressure, so as to provide a "buffer zone" that protects such system against gas leakage or explosion.

Moreover, if the target gas is flammable (for example, hydrogen or methane gas), the interstices between the microtubular elements 16 at the shell sides are preferably filled with a fire retardant material 15, which functions to further reduce the risk of explosion in case of a cell fire.

In the specific embodiment shown in FIG. 1, each microtubular element 16 is enclosed at one end, and potted at the other end by a potting member 13, so as to seal the bore side of such microtubular element from its shell side. Such potting member 13 and the housing 12 define a gas-filled headspace 12A, and a body portion 12B in which the target gas is confined to the bore sides of individual microtubular elements and kept away from the shell sides thereof.

Other methods can also be used to seal the bore sides of the microtubular elements from the shell sides thereof. For example, microtubular elements with two open ends can be potted at both ends by two potting members, so as to seal their bore sides from their shell sides; alternatively, long microtubular elements with two open ends can be curved into U-shape, so that both open ends of such microtubular elements can be potted by a single potting member. Such methods can be readily designed and configured by a person ordinarily skilled in the art, and are therefore within the broad scope of the present invention.

The potting of the microtubular elements 16 can be carried out by using adhesives or resin "potting" materials (such as epoxy), to form an airtight seal, according to the disclosure of Eshraghi U.S. Pat. Nos. 5,916,514; 5,928,808; 5,989,300; 6,004,691; 6,338,913; 6,399,232; 6,403,248; 6,403,517; 6,444,339; and 6,495,281.

Each microtubular element 16 in FIG. 1 therefore functions as an independent and separate micro-container for the target gas-containing sorbent material 18, which provides enhanced structural support for pressurized gas storage and effective separation of the target gas, and reduces the risk of gas leakage or explosion.

Although the tubular walls of such microtubular elements are very thin, they nevertheless can withstand high pressure (i.e., ~1000 psig). In general, the smaller the OD of such microtubular elements, the higher the burst pressure thereof. The relationship between the OD and the burst pressure of microtubes is well known, and can be readily ascertained by a person ordinarily skilled in the art.

The gas-impermeable tubular walls of the microtubular elements 16 of FIG. 1 can be made of any suitable gas-impermeable materials, such as polymers, metals, metal alloys, ceramic, glass, etc. Preferably, they are made of a gas-impermeable polymeric material of sufficient tensile strength, so that the microtubular elements can endure sufficient interior pressure.

The target gas of the present invention can be any gas selected from hydrogen, methane, ethane, propane, silane, diborane, ammonia, arsine, phosphine, chlorine, fluorine, hydrogen fluoride, hydrogen chloride, hydrogen iodide, hydrogen bromide, hydrogen sulfide, etc. The sorbent material for such target gas can be either a physical sorbent, or a chemisorbent material, for selective absorption or adsorption of the target gas.

In a specific embodiment of the present invention, the target gas is hydrogen, and the sorbent material comprises a hydrogen-sorbent, which may include, but is not limited to, metal hydride alloys, carbonaceous materials, zeolites, silica gels, amorphous metal compositions, and molecular sieves.

Suitable metal hydride alloys for hydrogen storage in the present invention include the rare-earth-metal-based metal hydrides having a generic formula of $AB_5$ (A=La, Nd, Ce, Pr, and B=Ni, Al, Co, Mn), and the early-transition-metal-based metal hydrides having a generic formula of $AB_2$ (A=Ti, Zr, and B=Ni, V, Cr, Mn). Such metal hydride alloys are capable of storing hydrogen gas at about 1 wt % to about 2 wt % at room temperature, and up to about 5 wt % at elevated temperatures (130° C.).

Suitable carbonaceous materials for hydrogen storage in the present invention include, but are not limited to, carbon powders, carbon fibers, activated carbon, amorphous carbon, fullerenes, carbon nanotubes, carbon nanofibers, carbon nanoropes, graphite, and nano-structured carbon powders containing transition metal clusters. Fullerenes and carbon nanotubes are single or multiple atomic layers of graphite wrapped together into very stable ball or tube molecules, respectively. Nanoropes are extremely strong fibers consisting of bundles of nanotubes. Nanofibers are multiple layers of graphite stacked into fibers that are less than a micrometer in diameter. Carbon fibers are polymer strands with high carbon content. Carbon nanotubes are specifically suitable for storing hydrogen, with a hydrogen storage capacity of 5 wt % to 10 wt % at room temperature and atmospheric pressure.

The gas storage and dispensing system of the present invention can also carry the target gas by using a liquid carrier material, instead of a solid sorbent material as shown in FIG. 1. Such liquid carrier material either physically carries the target gas in a liquefied or dissolved state, or chemically carries the target gas in a chemically bounded state.

Figure 2:
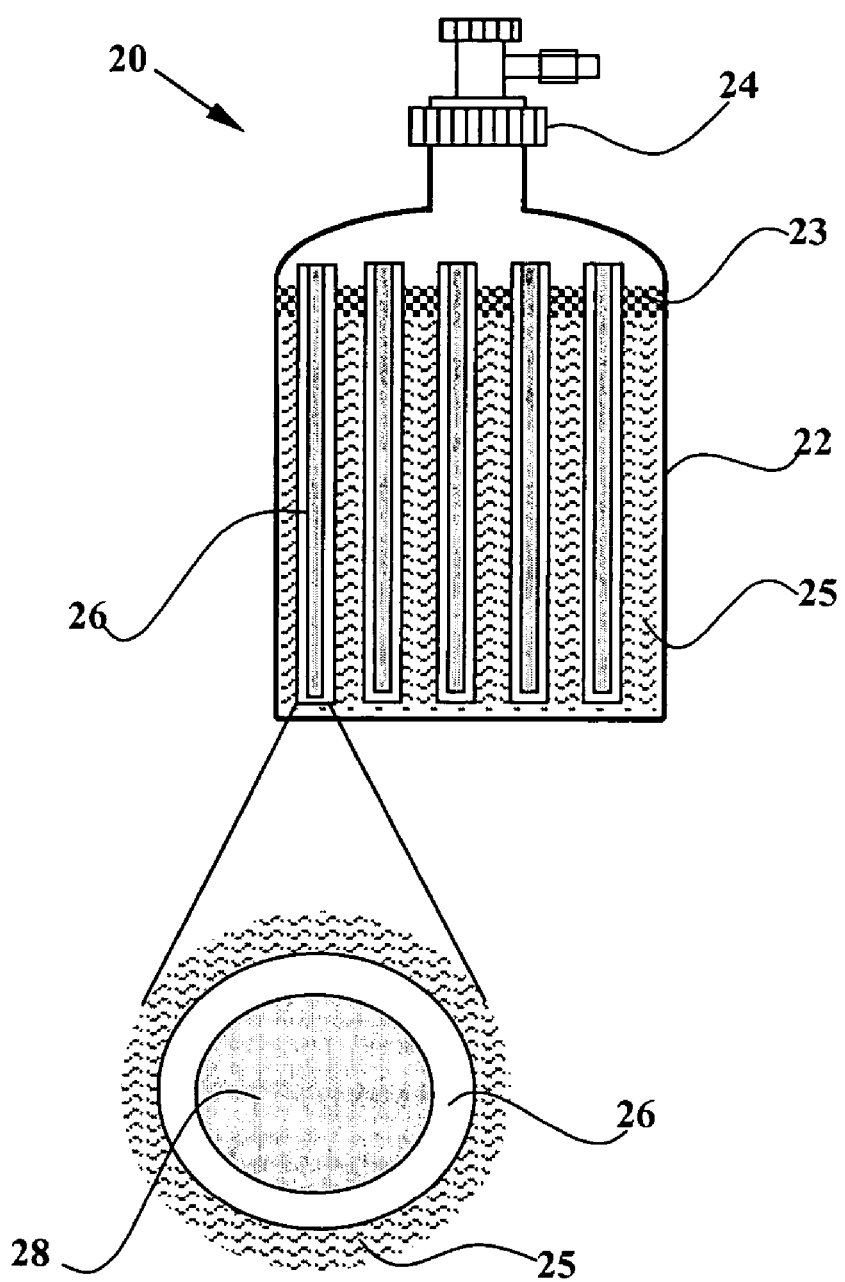
FIG. 2 shows a gas storage system comprising multiple microtubular elements and a liquid carrier of a target gas disposed at the bore sides of the microtubular elements, according to one embodiment of the present invention.

FIG. 2 shows a gas storage and dispensing system using such a liquid carrier material, according to one embodiment of the present invention.

Specifically, the gas storage and dispensing system 20 of FIG. 2 comprises a housing 22, in which the multiple microtubular elements 26 are disposed. Each microtubular element 26 comprises a tubular wall that is both gas- and liquid-impermeable, which defines a bore side and a shell side.

A liquid carrier material 28 for carrying the target gas in liquid form is disposed at the bore side of each of the multiple microtubular elements 26, and the target gas can be dispensed therefrom through a valve head 24. When the target gas is specifically hydrogen, the liquid carrier material 28 may be selected from the group consisting of liquefied hydrogen, organic hydrogen solvents, borohydride solutions, etc.

The microtubular elements 26 are enclosed at first ends, and are potted by a potting member 23 at the second, opposite ends, so that the bore sides of such microtubular elements 26 are completely sealed from the shell sides, and the liquid carrier material 28 and the target gas stored therein at the bore sides of the microtubular elements cannot enter the shell sides, leaving the interstices between the microtubular elements at the shell sides free of both the liquid carrier material and the target gas.

If the target gas is flammable (for example, hydrogen or methane gas), the interstices between the microtubular elements 26 at the shell sides can be further filled with a fire retardant material 25.

Other sealing methods can also be used to seal the bore sides of the microtubular elements 26 from the shell sides thereof, as described hereinabove for FIG. 1.

The solid or liquid carrier material for the target gas can also be disposed at the shell sides of the microtubular elements, instead of the bore sides thereof, according to another embodiment of the present invention, as shown in FIGS. 3 and 4 and described in details hereinafter.

FIG. 3A shows a gas storage and dispensing system, comprising multiple microtubular elements 36 disposed in a housing 32 having a valve head 34. Each of the microtubular elements comprises a tubular wall defining a bore side and a shell side.

The tubular walls of such microtubular elements 36 are gas-permeable, which can be made of a porous material having porosity in a range suitable for applications selected from the group consisting of ultrafiltration, microfiltration, and reverse osmosis, and which can also be made of a semipermeable or ion exchange membrane. Examples of materials suitable for forming such porous microtubular elements 36 include, but are not limited to polysulfone, polypropylene, polyacrylonitrile, polytetrafluoroethylene (PTFE), polyethylene, polyvinylidene fluoride (PVDF), triacetates, etc.

The bore sides of the microtubular elements 36 are sealed from the shell sides thereof, by any methods described hereinabove for FIG. 1. In the specific structure shown in FIG. 3A, the microtubular elements 36 are enclosed at one ends thereof, and are potted at the other ends thereof by a potting member 33, so that the bores are sealed completely from the shell sides thereof.

The potting member 33 divides the housing 32 into a headspace 32A that communicates with the bore sides of the microtubular elements 36, and a body portion 32B that communicates with the shell sides of the microtubular elements 36, while the headspace 32A and the body portion 32B are sealed from each other by the potting member 33 in a leak-tight manner, so that no gas can flow between from such headspace 32A and the body portion 32B except through the tubular walls of the microtubular elements 36.

The interstices between the microtubular elements 36 at their shell sides are filled with a sorbent material 38 having sorptive affinity for the target gas for sorptively carrying the same. Such sorbent material 38 is limited only to the body portion 32B of the housing 32, by the potting member 33, and the tubular walls and the enclosed ends of the microtubular elements 36, and therefore will not enter into the headspace 32A in the event that the housing 32 is turned upside down.

The target gas that is sorptively carried by the sorbent material 38 can diffuse from such sorbent material in the body portion 32B through the tubular walls of the microtubular elements 36 into the bore sides thereof, as shown in FIG. 3B, which can subsequently enter into the headspace 32A and be dispensed from the valve head 34 for downstream usage. The sorbent material 38 is advantageously kept in the body portion 32B and will not enter into either the bore sides of the microtubular elements 36 or the headspace 32A to block the gas passages, regardless of the direction in which the housing 32 is placed, i.e., either upstanding, upside-down, or reclined.

Moreover, when the sorbent material 38 is exhausted, it can be recharged with the target gas, by connecting the valve head 34 to a target gas source, and pressure can be applied so as to enhance the speed of such recharging process. The recharged target gas enters into the headspace 32A from the valve head 34, and then into the bore sides of the microtubular elements 36. The porous, gas-permeable tubular walls of the microtubular elements 36 provide increased diffusion surface to allow diffusion of the recharged target gas from the bore sides of the microtubular elements 36 into the sorbent material 38 at the shell sides therethrough, as shown in FIG. 3C.

In a further embodiment of the present application, a liquid carrier material for the target gas can be disposed at the shell sides of the microtubular elements in the gas dispensing and storage system.

Figure 4A:
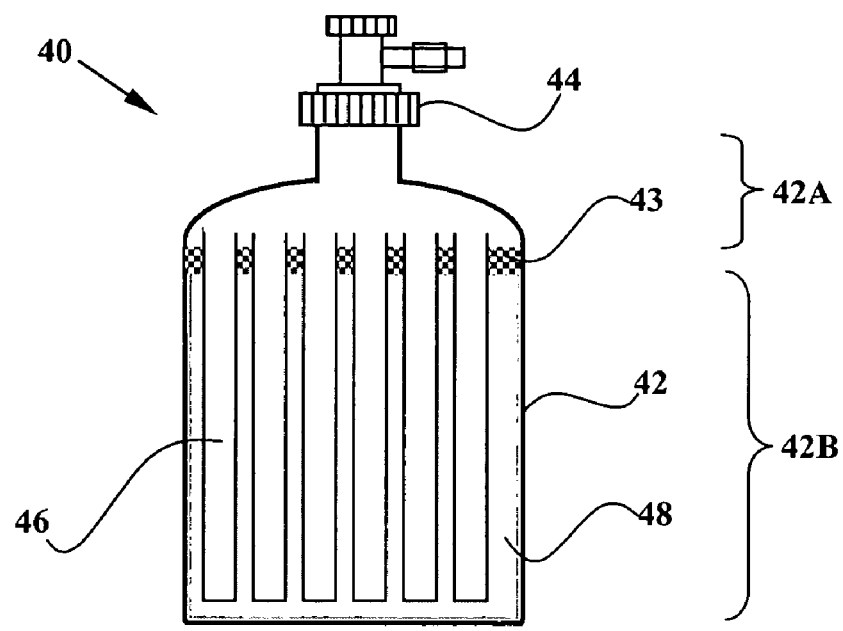
FIG. 4A shows a gas storage system comprising multiple microtubular elements and a liquid carrier of a target gas disposed at the shell sides of such microtubular elements, according to one embodiment of the present invention.

FIG. 4A shows a gas dispensing system 40 comprising multiple microtubular elements 46 placed in a housing 42 having a valve head 44. Each of the microtubular elements 46 comprises a tubular wall defining a bore side and a shell side.

The tubular walls of such microtubular elements 46 are gas-permeable but liquid-impermeable, which can be made either of a semi-permeable membrane material that is sufficiently dense to only allow diffusion of gas therethrough, or a porous, hydrophobic membrane material having porosity in a range suitable for applications selected from the group consisting of ultrafiltration, microfiltration, and reverse osmosis. Examples of materials suitable for forming such microtubular elements 46 include, but are not limited to polypropylenes, polyethylenes, polyurethanes, polymethylpentenes, polytetrafluoroethylenes, etc.

The bore sides of the microtubular elements 46 are sealed from the shell sides thereof, by any methods described hereinabove for FIG. 1. In the specific structure shown in FIG. 4A, the microtubular elements 46 are enclosed at first ends thereof, and are potted at the second, opposite ends thereof by a potting member 43, so that the bores are sealed completely from the shell sides thereof.

The potting member 43 divides the housing 42 into a headspace 42A that communicates with the bore sides of the microtubular elements 46, and a body portion 42B that communicates with the shell sides of the microtubular elements 46, while the headspace 42A and the body portion 42B are sealed from each other by the potting member 43 in a leak-tight manner, so that liquid cannot enter from the body portion 42B into the headspace 42A or vice versa, and gas can only flow therebetween through the gas-permeable tubular walls of the microtubular elements 46.

The interstices between the microtubular elements 46 at their shell sides in the body portion 42B are filled with a liquid carrier material 48 that carries the target gas. Such liquid carrier material 48 is limited only to the body portion 42B of the housing 42, by the potting member 43, the liquid-impermeable tubular walls, and the enclosed ends of the microtubular elements 46, and it therefore will not leak into the headspace 42B in the event that the housing 42 is turned upside down.

Figure 4B:
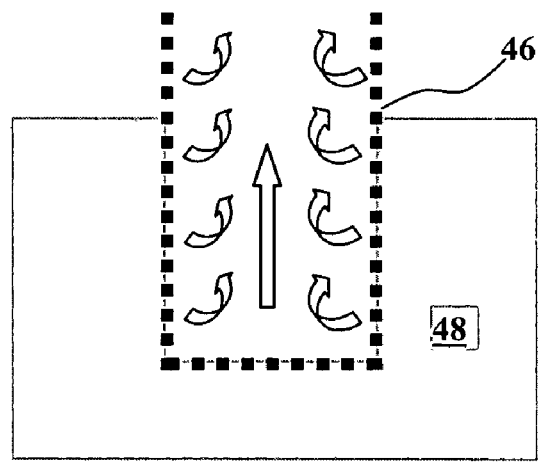
FIG. 4B shows the egress of the target gas from the liquid carrier of FIG. 4A, through an individual microtubular element.

The target gas that is carried by the liquid carrier material 48 can be released therefrom through the gas-permeable tubular walls of the microtubular elements 46 into the bore sides thereof, as shown in FIG. 4B, which can subsequently enter into the headspace 42A and be dispensed from the valve head 44 for downstream usage. The liquid carrier materials 48, however, is kept in the body portion 42B and will not leak into either the bore sides of the microtubular elements 46 or the headspace 42A regardless of the direction in which the housing 42 is placed.

The gas storage and dispensing system of FIG. 4A is particularly advantageous for storing and dispensing hydrogen gas, using a liquid hydrogen carrier. Suitable liquefied hydrogen carrier include, but are not limited to, liquefied hydrogen, organic hydrogen solvents that physically dissolve and carry hydrogen, and metal hydride solutions that release hydrogen under suitable conditions, as described in details hereinafter.

Figure 5A:
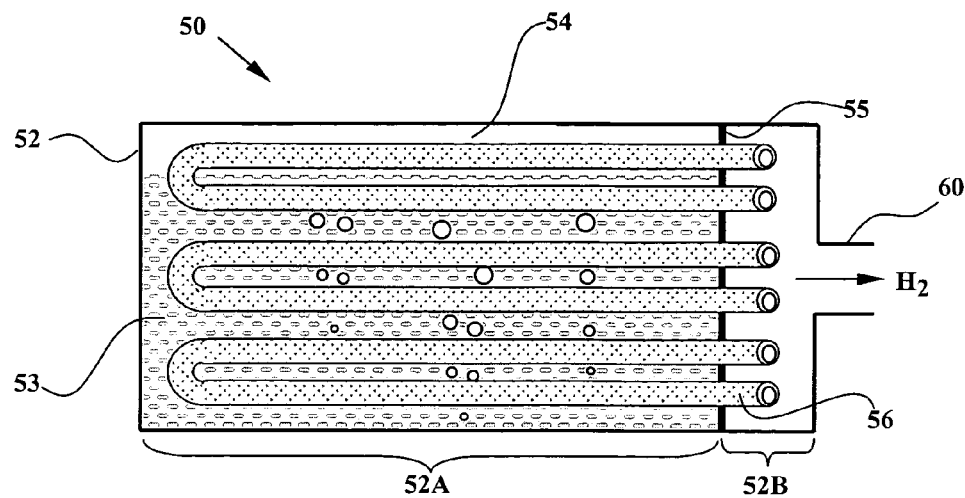
FIG. 5A shows a hydrogen storage and dispensing system placed in a horizontal direction, which comprises a liquid hydrogen carrier and multiple microtubular elements immersed therein, according to one embodiment of the present invention.

FIG. 5A shows a hydrogen storage and dispensing system 50, which comprises a housing 52 and multiple microtubular elements 56 placed therein. Each microtubular element 56 comprises two open ends and is bent into a U-shape, so a single potting member 55 can pot both open ends of such microtubular element for the purpose of sealing the bore sides from the shell sides of such element.

The potting member 55 divides the housing 52 into a liquid compartment 52A and a hydrogen collection compartment 52B, which are separated from each other in a leak-tight manner. The microtubular elements 56 extend from the liquid compartment 52A to the hydrogen collection compartment 52B, while the open ends of such microtubular elements 56 terminate in the hydrogen collection compartment 52B.

The liquid compartment 52A is filled with a liquid hydrogen carrier 53, which can be liquefied hydrogen, an organic hydrogen solvent that dissolves hydrogen, or a metal hydride solution that is capable of releasing hydrogen. The tubular walls of the microtubular elements 56 are gas-permeable but liquid-impermeable, so the liquid hydrogen carrier 53 is limited to the liquid compartment 52A at the shell sides of such microtubular elements and cannot enter either the bore sides thereof or the hydrogen collection compartment 52B, while hydrogen gas can diffuse from the shell sides of the microtubular elements through such tubular walls to the bore sides.

The shell sides of at least some of the microtubular elements 56 therefore are in direct contact with the liquid hydrogen carrier 53 for collection of hydrogen gas therefrom, and the bore sides of the microtubular elements are in fluid communication with the hydrogen collection compartment 52B. In such manner, the microtubular elements 56 function to collect hydrogen from the liquid hydrogen carrier in the liquid compartment 52A and transport such hydrogen to the hydrogen collection compartment, from where the collected hydrogen can be dispensed via a hydrogen outlet 60, while preventing entry of the liquid hydrogen carrier into the hydrogen collection compartment 52B or the hydrogen outlet 60.

Moreover, a small headspace 54 is provided in the liquid compartment 52A, in which hydrogen released by the liquid hydrogen carrier is accumulated. At least a portion of the microtubular elements 56 contacts such hydrogen-accumulated headspace 54, which increases the speed of hydrogen transportation from the liquid compartment 52A into the hydrogen collection compartment 52B.

One advantage of the hydrogen storage and dispensing system as shown in FIG. 5A is that it is capable of stable hydrogen delivery regardless of its position or direction. FIG. 5A shows such system as placed in a horizontal direction, and FIGS. 5B and 5C show it as placed in a vertical or a upside-down direction, respectively, while in each direction, such system is capable of delivering hydrogen without allowing the liquid hydrogen carrier to overflow the hydrogen collection compartment or hydrogen outlet.

Therefore, such hydrogen storage and dispensing system of the present invention is particularly suitable to be used for supplying hydrogen to mobile devices, where position changes are inevitable.

Figures 5B, 5C:
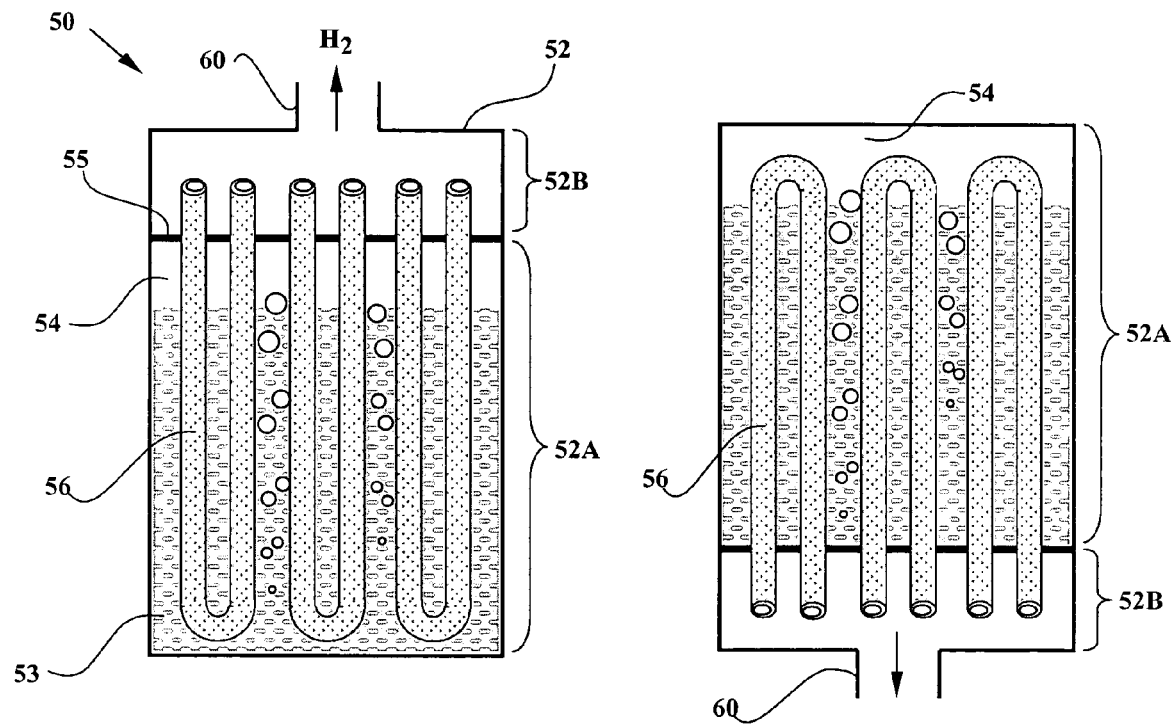
FIGS. 5B and 5C shows the hydrogen storage and dispensing system of FIG. 5A, placed in a vertical direction and an upside-down direction.

The microtubular elements of such hydrogen storage and dispensing system can be potted according to the configuration shown in FIGS. 5A-5C, and they can also be potted in other manners. For example, they can be enclosed at first ends and be potted at the second, opposite ends, or they can have both ends open and be potted at both ends by two potting members. The configuration shown in FIGS. 5A-5C is only exemplary and is not intended to limit the broad scope of the present invention.

The microtubular elements of such hydrogen storage and dispensing system may comprise tubular walls of a single-layer structure or a multi-layer structure.

Figure 6A:
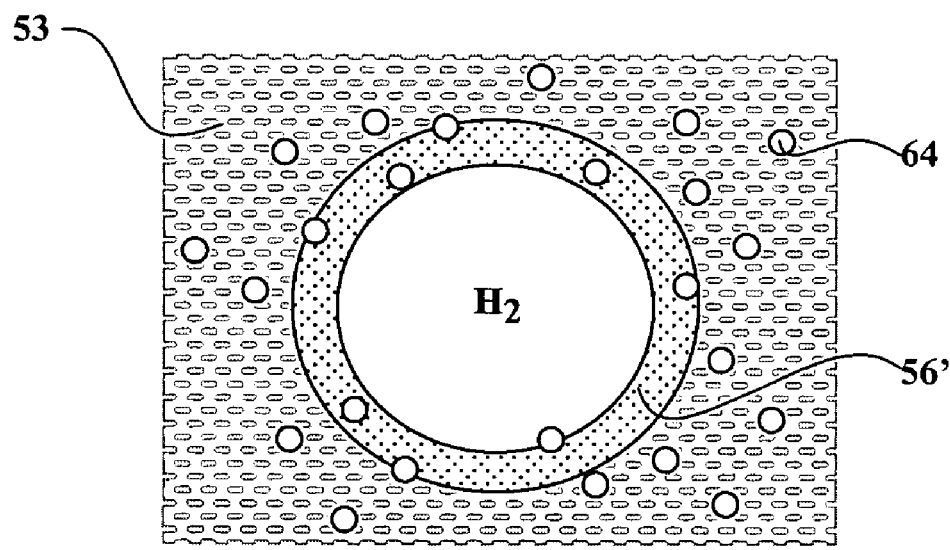
FIG. 6A shows a cross-sectional view of an individual microtubular element immersed in a liquid hydrogen carrier for collection of hydrogen gas, according to one embodiment of the present invention.

FIG. 6A shows an individual microtubular element as immersed in the liquid hydrogen carrier 53. Such microtubular element comprises a single-layer tubular wall 56' made of a gas-permeable and liquid-impermeable material, which is preferably a microporous, hydrophobic polymeric material selected from the group consisting of polypropylenes, polyethylenes, polyurethanes, polymethylpentenes, polytetrafluoroethylenes, etc. Hydrogen gas 64 can diffuse through the tubular wall 56' of such microtubular element and enter into the bore side thereof, while the liquid hydrogen carrier 53 cannot and therefore is limited only to the shell side thereof.

Figure 6B:
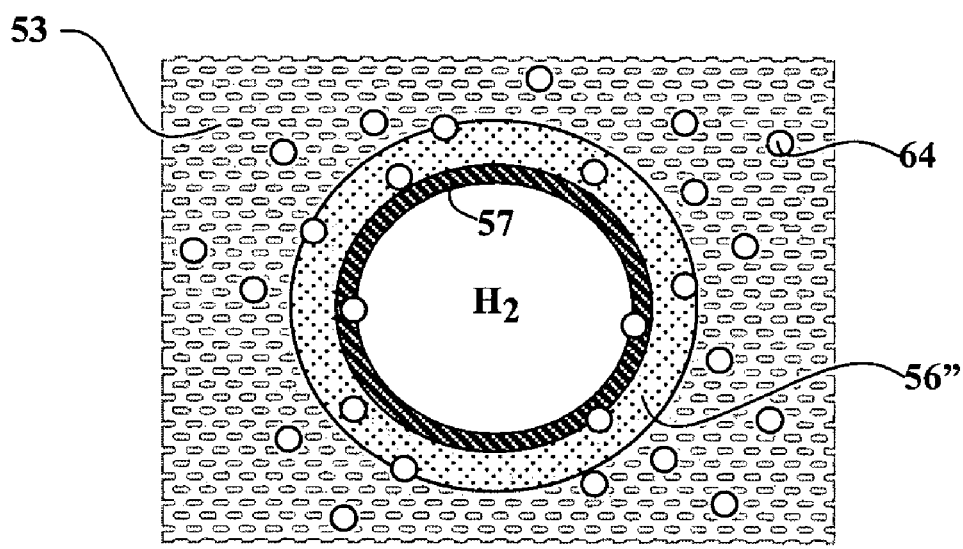
FIG. 6B shows a cross-section view of another individual microtubular element immersed in a liquid hydrogen carrier for collection of hydrogen gas, according to another embodiment of the present invention.

FIG 6B shows another individual microtubular element as immersed in the liquid hydrogen carrier 53 which comprises a double-layer tubular wall having an outer layer 56" made of a structural material that is both gas- and liquid-permeable, and an inner layer 57 made of a membrane material that is gas-permeable but liquid-impermeable.

Other configurations of the microtubular elements suitable for practice of the present invention can be readily determined by a person ordinarily skilled in the art, consistent with the teachings and suggestions provided herein.

The present invention in a more specific aspect relates to a hydrogen storage and dispensing system, which utilizes a metal hydride solution as the liquid hydrogen carrier, to provide a safe hydrogen storage and dispensing system of high storage capacity. Preferably, a borohydride solution is used. More preferably, a $NaBH_4$ solution is used for hydrogen generation, which comprises $NaBH_4$ at a concentration in a range of from about 10% to about 35% by total weight of the solution, and sodium hydroxide at a concentration in a range of from about 2% to about 4% by total weight of the solution.

Such metal hydride solution does not release hydrogen at stabilized conditions and can be safely transported and stored at atmospheric pressure and room temperature. However, upon contact with a hydrogen generation catalyst material, or upon addition of an acidic solution thereinto, it generates hydrogen gas with a very high volumetric ratio.

The following table shows the gravimetric and volumetric hydrogen conversion rate for sodium borohydride solutions of various concentrations:

TABLE I

VOLUMETRIC HYDROGEN CONVERSION RATE

| Volume of $NaBH_4$ Solution | Mass of $H_2$ Produced | Standard Volume of $H_2$ Produced (70° F., 1 atm) |
| --- | --- | --- |
| 1 Liter $NaBH_4$-20% solution | 44 Grams | 526 Standard Liters |
| 1 Liter $NaBH_4$-25% solution | 55 Grams | 658 Standard Liters |
| 1 Liter $NaBH_4$-30% solution | 66 Grams | 789 Standard Liters |
| 1 Liter $NaBH_4$-35% solution | 77 Grams | 921 Standard Liters |

Using borohydride solutions for hydrogen generation is well known in the art. See Schlesinger et al., *Sodium Borohydride, Its Hydrolysis and Its Use as A Reducing Agent and In the Generation of Hydrogen*, JOURNAL OF THE AMERICAN CHEMICAL SOCIETY, 75:215 (1953); Kaufman et al., *Hydrogen Generation by Hydrolysis of Sodium Tetrahydroborate: Effects of Acids and Transition Metals and Their Salts*, JOURNAL OF THE CHEMICAL SOCIETY, Dalton Trans 2:307 (1985); Amendola et al., *A Safe Hydrogen Generator Using Aqueous Borohydride Solutions (II)*, JOURNAL OF POWER SOURCES, 85:186 (2000). Moreover, U.S. Patent Application Publication No. 2002/0083643 discloses a hydrogen generation system comprising a metal hydride solution and a hydrogen generation catalyst, the content of which is incorporated by reference hereby in its entirety for all purposes.

It is important to notice that the novelty and inventiveness of the present invention do not lie in the usage of metal hydride solutions for hydrogen generation, which is well known in the art.

Instead, such novelty and inventiveness of the present invention lie in the usage of microtubular elements for constructing a hydrogen storage and dispensing system, wherein hydrogen is collected by such microtubular elements, and wherein hydrogen delivery is stabilized, regardless of the position in which such system is placed, as described hereinabove. Employment of the metal hydride solutions as the liquid hydrogen carrier is a preferred, but not essential, feature of the present invention.

Figure 7:
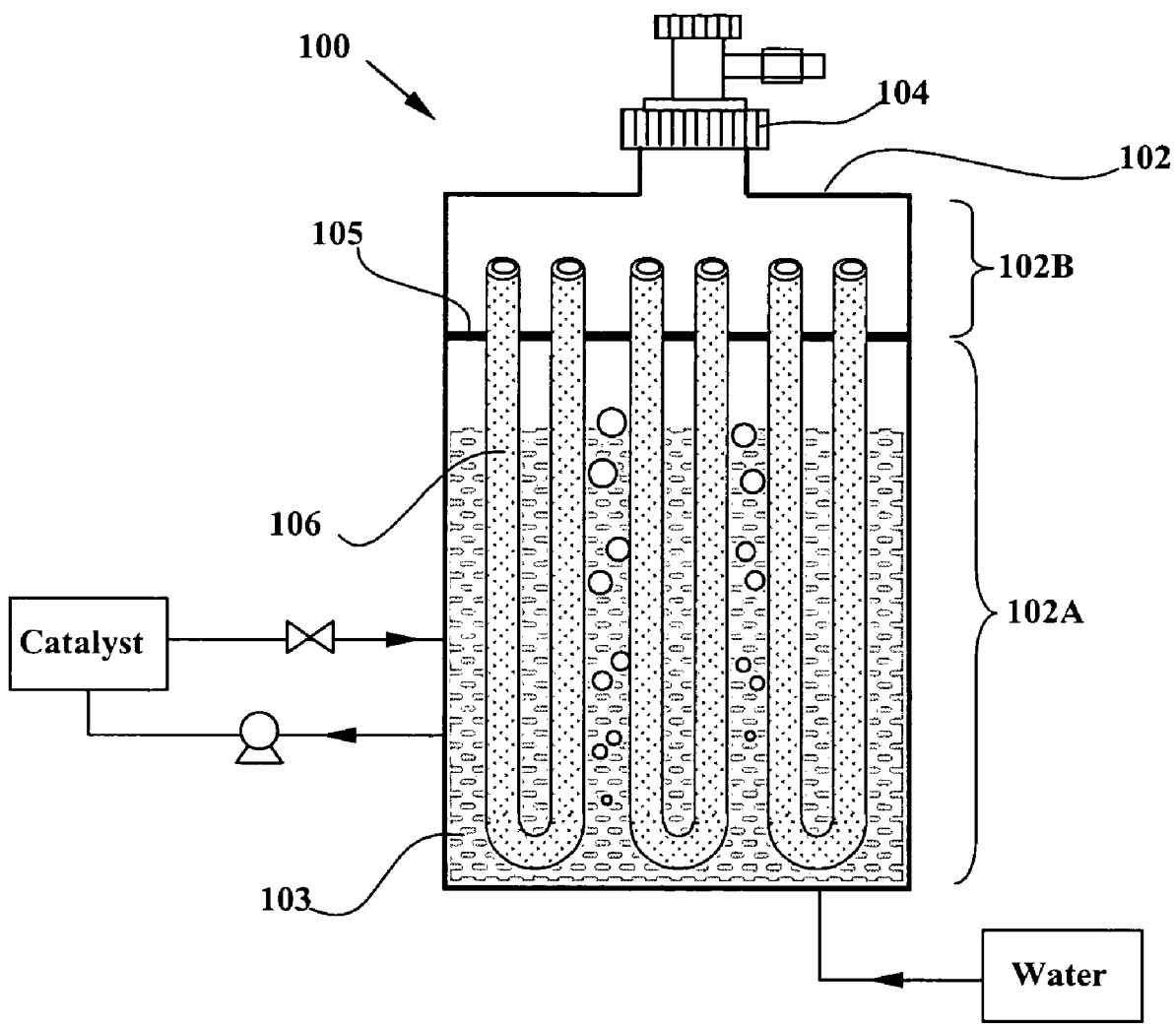
FIG. 7 shows a hydrogen storage system that releases hydrogen gas through a catalyst-based hydrogen release control mechanism, according to one embodiment of the present invention.

FIG. 7 shows a hydrogen storage and dispensing system 100 comprising a housing 102 with a valve head 104, in which multiple microtubular elements 106 and a metal hydride solution 103, preferably a borohydride solution, is disposed.

A potting member 105 pots the microtubular elements 106 at the upper ends and separates the housing 102 into a liquid compartment 102A and a hydrogen collection compartment 102B. The metal hydride solution 103 is disposed in the liquid compartment 102A and contacts the shell sides of the microtubular elements 106, while the bore sides of the microtubular elements 106 are in fluid communication with the hydrogen collection compartment 102B, so that hydrogen gas generated by the metal hydride solution can diffuse through the tubular walls of the microtubular elements 106 into the hydrogen collection compartment and be dispensed by the valve head 104 of the housing 102.

The release of hydrogen from the metal hydride solution 103 can be effectuated by either controllably adding an acidic solution thereinto, or by controllably contacting such metal hydride solution with a hydrogen generation catalyst, as described in U.S. Patent Application Publication No. 2002/0083643. Either way, the speed and amount of hydrogen released from the metal hydride solution can be readily controlled, according to the downstream requirements for hydrogen consumption.

In FIG. 7, an exemplary catalyst-based hydrogen release control mechanism is provided, which comprises a pump, a catalyst bed comprising a hydrogen generation catalyst material, and a control valve. The metal hydride solution 103 is circulated through the catalyst bed, so as to effectuate hydrogen release therefrom. Such circulation is effectively controlled by the control valve and can be terminated at any time by shutting off the pump.

Alternatively, the catalyst bed can be contained in a tubular liquid-impermeable container and placed inside the metal hydride solution 103, while the tubular container has an unidirectional valve or a backflow-preventing device mounted thereon, to control flow of the metal hydride solution thereinto. In such manner, the catalyst-based hydrogen release control mechanism is protected against external forces by the housing 102 and advantageously forms an integral structure with the other components of the hydrogen storage and dispensing system.

Catalyst-based hydrogen release control mechanisms of other configurations can also be used for effectuating controlled hydrogen generation and are therefore within the broad scope of the present invention, as long a such mechanism contacts the metal hydride solution with the hydrogen generation catalyst material in a controlled manner.

Figure 8:
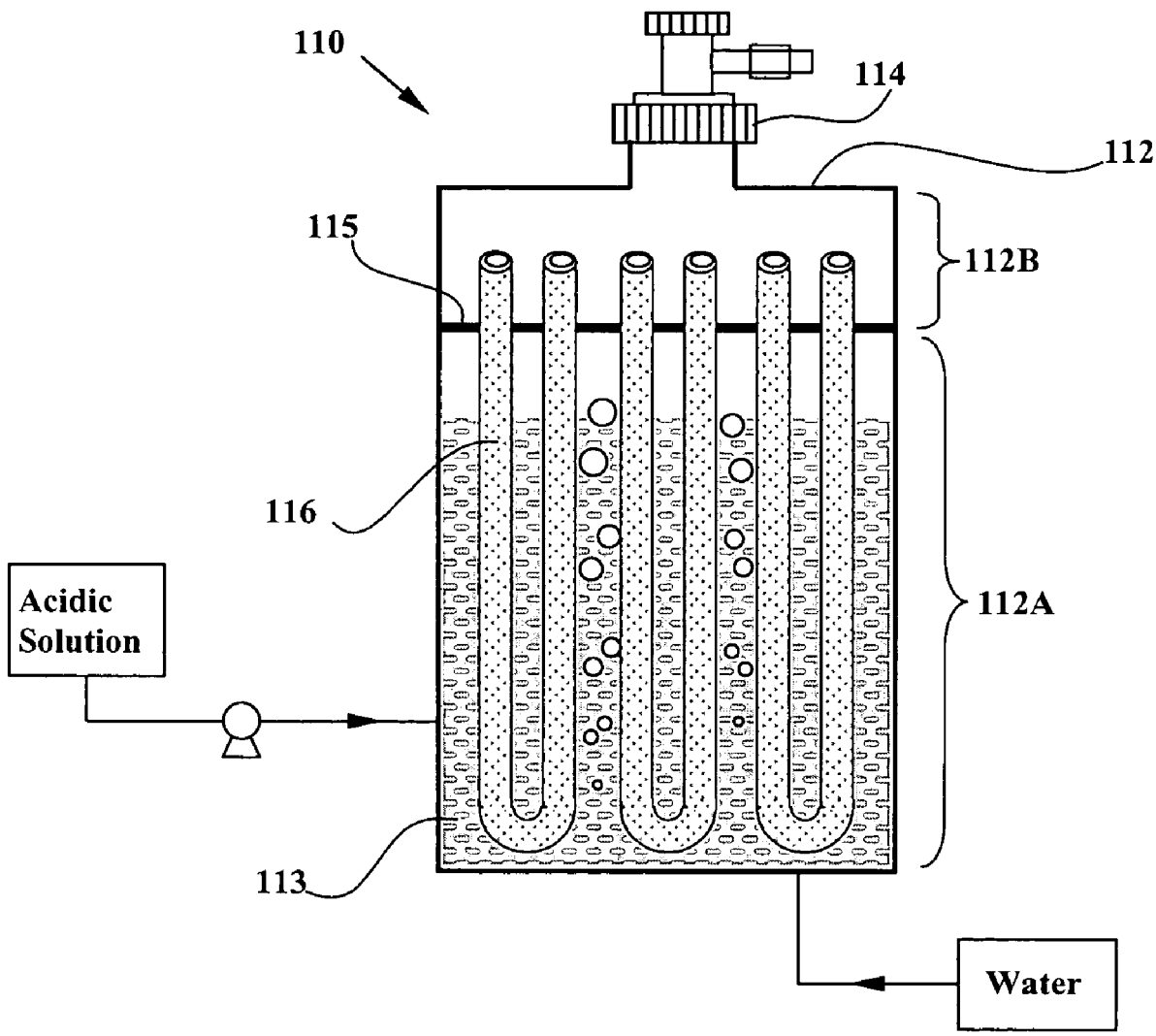
FIG. 8 shows a hydrogen storage system that releases hydrogen gas through a pH-based hydrogen release control mechanism, according to one embodiment of the present invention.

In FIG. 8, an exemplary pH-based hydrogen release control mechanism is provided, which comprises a pump and a reservoir for an acidic solution. A suitable amount of the acidic solution can be added by the pump in a controlled manner into the metal hydride solution 113 in the liquid compartment 112A of the hydrogen storage and dispensing system 110 of FIG. 8, so as to lower the pH value of such metal hydride solution and to effectuate hydrogen generation therefrom.

A controller can be used to regulate the circulation of the metal hydride solution through the catalyst bed or the release of the acidic solution into the metal hydride solution. Such controller can be either manually operated, or automatically operated by a microcontroller, a computer, or a computer network. Preferably, it is operated by a microcontroller that calculates the desired hydrogen-dispensing rate and the corresponding circulation rate of the metal hydride solution, or the corresponding amount of acidic solution to be added into such metal hydride solution. More preferably, the microcontroller can be connected to a pressure sensor (not shown), which detects the hydrogen pressure in the storage and dispensing system, so that if the pressure reaches a certain level, the microcontroller terminates the hydrogen generation process automatically.

It is important to note that all of the hydrogen atoms present in the metal hydride and in water are converted to hydrogen gas, and half of the hydrogen atoms in the hydrogen gas produced actually come from the water. Since two water molecules are consumed for each borohydride molecule, the concentration of all the remaining components will increase as the reaction continues, and the hydrolysis reaction of the metal hydride solution will slow down gradually, which in turn slows down the hydrogen generation therefrom.

Therefore, excess water is needed to sustain a constant rate of reaction. This excess water can be provided to the reaction in two ways: (1) charging the initial metal hydride solution with excess water, i.e., starting with a diluted solution or (2) adding more water from a separate source during or after the reaction.

In FIGS. 7 and 8, an external water source is provided for supplying water to the metal hydride solutions in the liquid compartment, so as to compensate for the water consumed during hydrogen generation and for maintaining the hydrogen generation rate from such metal hydride solution.

Moreover, the hydrogen generation rate of the hydrogen storage and dispensing system can be partially controlled by the amount of water added therein. For example, one can stop supplying water to the system, and the hydrogen generation will slow down gradually and terminate eventually.

In a preferred embodiment of the present invention, the water supplied to the hydrogen storage and dispensing system is provided by a downstream hydrogen fuel cell assembly, which generates water during the electrochemical reaction that converts the chemical energy in hydrogen gas into electrical energy. U.S. Pat. No. 6,403,248 issued to Ray Eshraghi, who is also an inventor of the present invention, specifically discloses a hydrogen fuel cell assembly with water management system for channeling water generated during the electrochemical reaction away from the fuel cell assembly. Such water can be supplied to the hydrogen storage and dispensing system of the present invention for maintaining the hydrogen generation rate.

It is therefore possible to provide a compact unit, which comprises a hydrogen storage and dispensing system, as described hereinabove, and a hydrogen fuel cell assembly connected therewith. The hydrogen fuel cell assembly preferably comprises a water management mechanism for removing water from such assembly and for supplying at least part of such water to the hydrogen storage and dispensing system. Thus, no external water source is necessary for such compact unit.

More importantly, when the hydrogen fuel cell assembly is not consuming hydrogen gas, no water is generated or supplied to the hydrogen storage and dispensing system, so the metal hydride solution in such system stops producing hydrogen gas gradually. The overall hydrogen pressure in such storage and dispensing system is therefore maintained at a relatively low level. When the hydrogen fuel cell assembly starts to operate, water is in turn generated thereby and supplied to the hydrogen storage and dispensing system, which restarts hydrogen generation by the metal hydride solution therein, therefore providing the hydrogen gas to the downstream hydrogen fuel cell assembly.

In such manner, no separate control devices are needed for controlling the supply of water to the hydrogen storage and dispensing system, since control devices for the hydrogen fuel assembly also function to control hydrogen generation from the hydrogen storage and dispensing system.

The hydrogen generation catalyst material can also be provided in such hydrogen storage and dispensing system of the present invention as an integral part of the microtubular elements.

Figure 9:
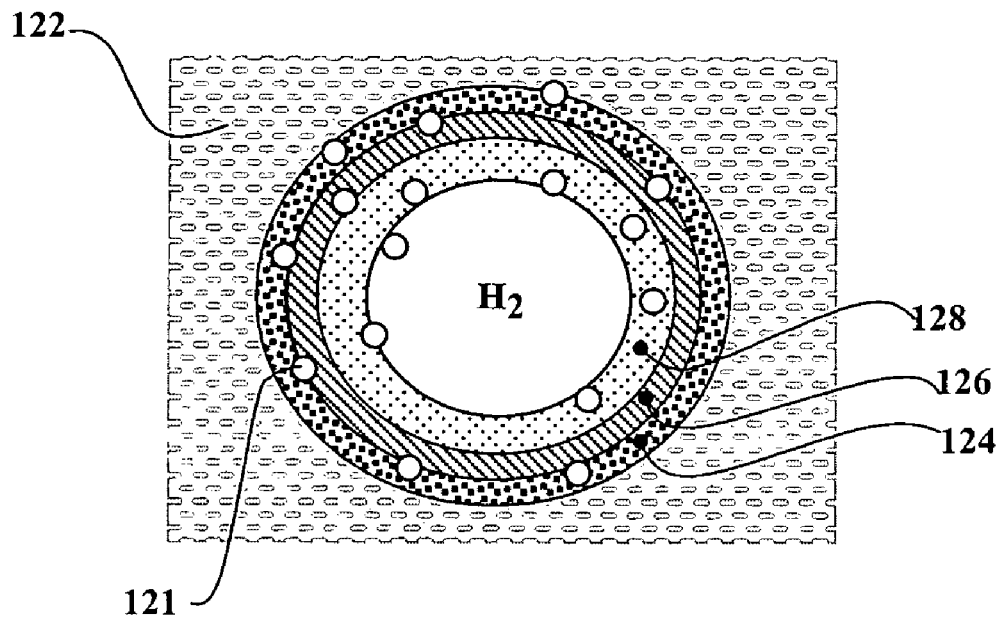
FIGS. 9 and 10 show an individual microtubular element immersed in a borohydride solution, wherein such microtubular element comprises a catalyst material therein for initiating hydrogen release, according to one embodiment of the present invention.
Figure 10:
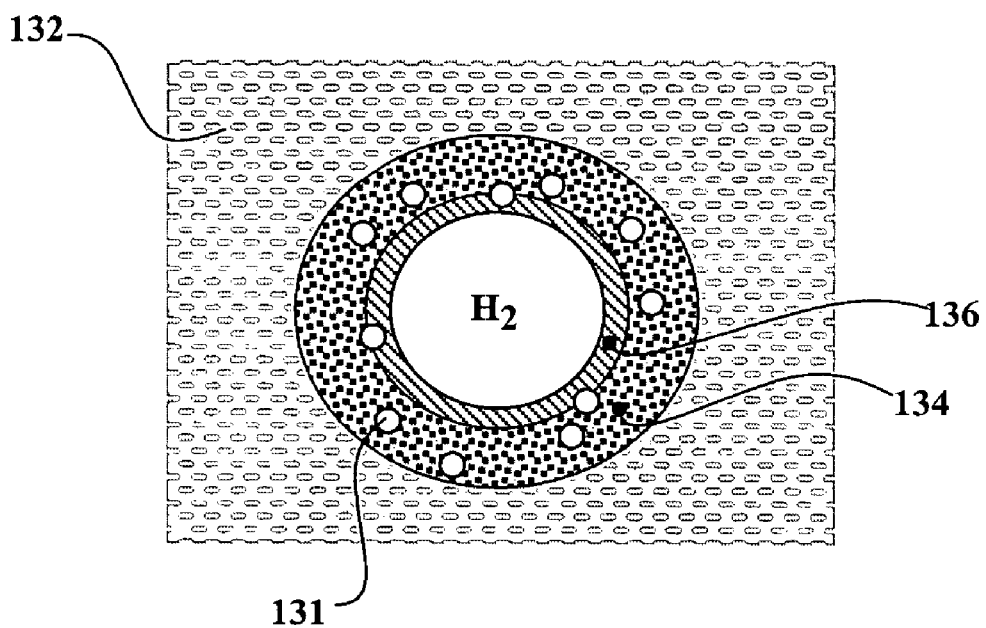

FIGS. 9 and 10 show various embodiments of individual microtubular elements comprising the hydrogen generation catalyst material therein.

Specifically, FIG. 9 shows a microtubular element as immersed in the metal hydride solution 122, which comprises a tubular wall of a three-layer structure, including a first layer 124 of the hydrogen generation catalyst material, a second layer 126 of a membrane material that is gas-permeable but liquid-impermeable, and a third layer 128 of a structural material that is gas- and liquid-permeable. The hydrogen generation catalyst material layer 124 directly contacts the metal hydride solution 122, resulting in generation of hydrogen gas 121. The gas-permeable and liquid-impermeable second layer 126 allows hydrogen gas 121 to diffuse therethrough, but prevents the metal hydride solution from leaking therethrough. The third layer 128 provides structural support for the microtubular element.

FIG. 10 shows a microtubular element as immersed in the metal hydride solution 132, which comprises a tubular wall of a two-layer structure, including a first layer 134 of a structural material that is gas- and liquid-permeable, and a second layer 136 of a membrane material that is gas-permeable but liquid-impermeable. The first layer 134 is impregnated with a hydrogen generation catalyst material, while the metal hydride solution can diffuse through such first layer 134 to contact the hydrogen generation catalyst material impregnated therein, so as to generate hydrogen gas 131. The gas-permeable and liquid-impermeable second layer 136 stops further diffusion of the metal hydride solution into the bore side of the microtubular element, but allows hydrogen diffusion therethrough.

Other configurations and modifications of microtubular elements with catalyst material therein can be readily determined by a person ordinarily skilled in the art, for purpose of practicing the present invention, and are therefore not explicitly illustrated therein.

The microtubular elements can, in a further aspect of the present invention, be used for immobilizing the hydrogen generation catalyst material, so as to form a catalyst bed through which the metal hydride solution can be circulated for more efficient hydrogen generation.

Figure 11A:
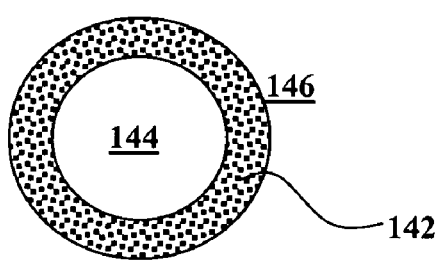
FIGS. 11A and 11B show a microtubular element useful for constructing a catalyst bed, wherein such microtubular element comprises immobilized, high surface area catalyst material therein, for flowing of a borohydride solution therethrough for generation of hydrogen gas, according to one embodiment of the present invention.

FIG. 11A shows a microtubular element 142 comprising a tubular wall defining a bore side 144 and a shell side 146, while the tubular wall is made of a microporous material that is permeable to both gas and liquid. Such tubular wall is impregnated with a hydrogen generation catalyst material.

Figure 12:
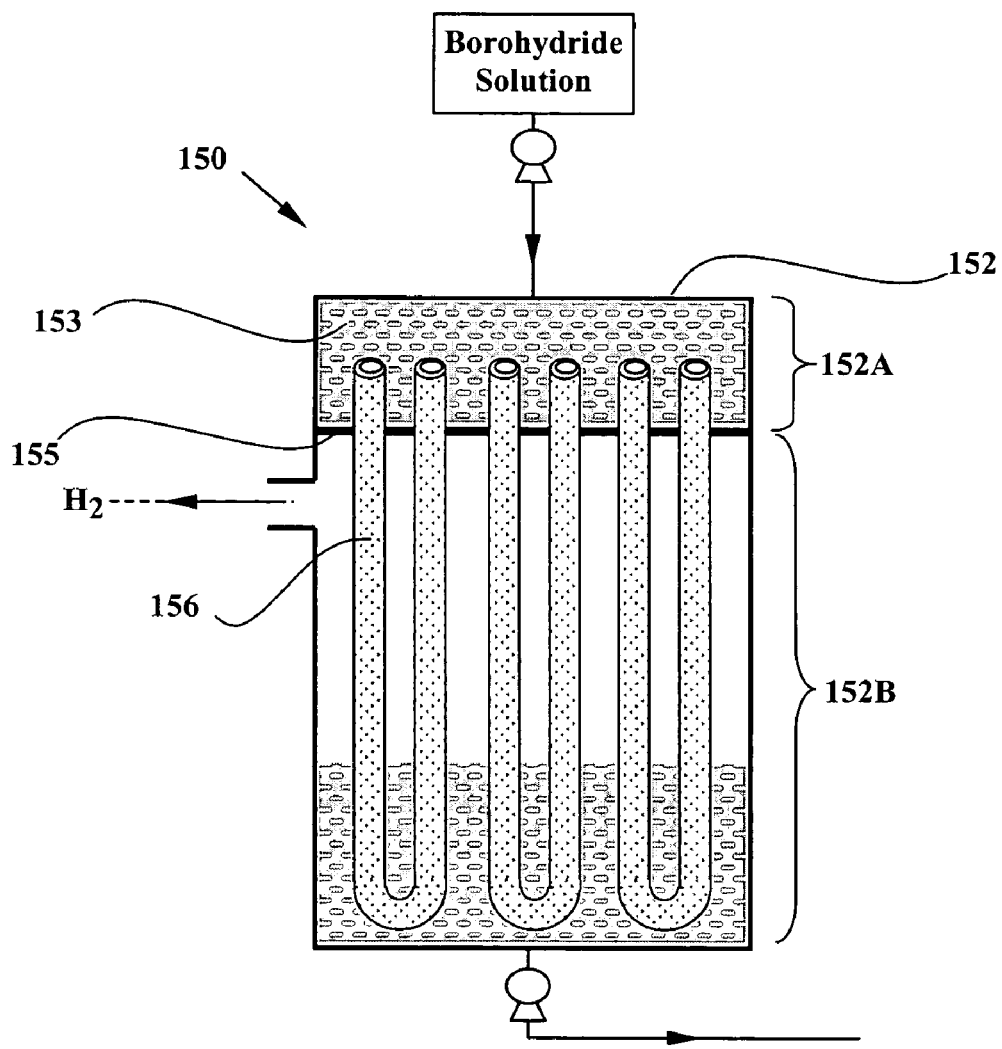
FIG. 12 shows a catalyst bed comprising multiple catalyzed microtubular elements of FIG. 11A or 11B, through which the borohydride solution can be passed for hydrogen generation, according to one embodiment of the present invention.

Multiple microtubular elements as that shown in FIG. 11A can be used to form a hydrogen generation catalyst structure 150, as shown in FIG. 12, which comprises a housing 152 and multiple microtubular elements 156 disposed therein.

Each microtubular element 156 has two open ends, and is bent into a U-shape and potted by a potting member 155, so as to isolate the shell sides of such microtubular elements from the bore sides thereof. Alternatively, the microtubular element 156 can be potted in a manner that is different from that shown in FIG. 12, for purpose of isolating the bore side of such microtubular element from its shell side. For example, such microtubular element can comprise one open end and one enclosed end and be potted by the potting member at the open end, or it can comprise two open ends and be potted by two potting members at both open ends. A person ordinarily skilled in the art can readily determine the methods and configuration for potting the microtubular elements of the present invention so as to isolate the bore sides from the shell sides thereof.

The potting member 155 divides the housing 152 into a first liquid compartment 152A and a second liquid compartment 152B, which are separated from each other in a leak-tight manner. The microtubular elements 156 extend from the first liquid compartment 152A through such potting member 155 to the second liquid compartment 152B, while the bore sides of such microtubular elements 156 are in fluid communication with the first liquid compartment 152A, and the shell sides of such microtubular elements 156 are in fluid communication with the second liquid compartment 152B.

A borohydride solution 153 is pumped into the first liquid compartment 152A through a fluid inlet (not shown), and enters into the bore sides of the microtubular elements 156. It flows therefrom through the gas- and liquid-permeable walls of the microtubular elements 156, comes into contact with the hydrogen generation catalyst impregnated therein, enters into the second fluid compartment 152B, and exits the system through a fluid outlet (not shown) in the second fluid compartment.

When the metal hydride solution comes into contact with the hydrogen generation catalyst material impregnated in the tubular walls of the microtubular elements 156, it starts to generate hydrogen gas, which can be collected from the headspace in the second liquid compartment 152B and dispensed through a hydrogen outlet, as shown in FIG. 12.

The microtubular elements 156 function to immobilize the catalyst material and to prevent it from entering the metal hydride solution 153 and exiting the catalyst structure 150 therewith. Moreover, the impregnated catalyst material advantageously has a high contact surface area and is more effective in activating the metal hydride solution.

Figure 11B:
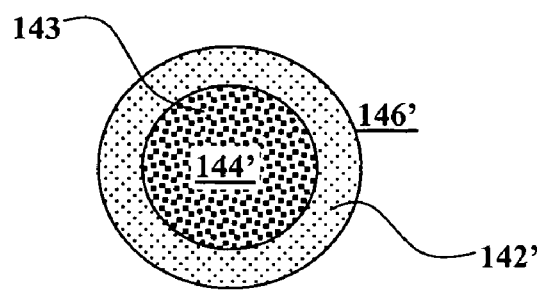

The hydrogen generation catalyst material can also be packed into the bore sides of the microtubular elements and be immobilized therein. FIG. 11B shows a microtubular element 142', according to one embodiment of the present invention, which has a microporous tubular wall that is both gas- and liquid-permeable, defining a bore side 144' and a shell side 146', while the bore side 144' is filled with a hydrogen generation catalyst material 143.

The above-described embodiments of the hydrogen generation catalyst structure of the present invention are only provided herein for illustrative purposes, and should not be construed to limit the broad scope of the present invention. Other suitable designs and configurations of the catalyst structure can be readily determined by a person ordinarily skilled in the art, depending on the specific system requirements.

Microfibrous Fuel Cell With Hydrogen Storage Capacity

The Eshraghi patents U.S. Pat. Nos. 5,916,514, 5,928,808, 5,989,300, 6,004,691, 6,338,913, 6,399,232, 6,403,248, 6,403,517, 6,444,339, and 6,495,281 describe various embodiments of microfibrous fuel cells, as well as assemblies of such microfibrous fuel cells, in flat sheet form, modulated form, and bundled form, with either series connection or parallel connection, or both.

However, such microfibrous fuel cells or fuel cell assemblies as disclosed in the Eshraghi patents require an external hydrogen source, which increases the complexity of the overall system and rendering such system more vulnerable to breakdowns.

The present invention therefore provides a compact fuel cell assembly comprising a plurality of microfibrous fuel cells, wherein each microfibrous fuel cell contains a hydrogen carrier material at its bore side, thus providing an internal hydrogen supply structure.

The hydrogen carrier material as mentioned herein is preferably a hydrogen-sorbent material having sorptive affinity for hydrogen gas. Such hydrogen sorbent material may be either a physical sorbent, or a chemisorbent that reversibly reacts with hydrogen. For example, such hydrogen sorbent material may include, but is not limited to, metal hydride alloys, carbonaceous materials, zeolites, silica gels, amorphous metal compositions, and molecular sieves, as described in great details hereinabove.

Figure 13:
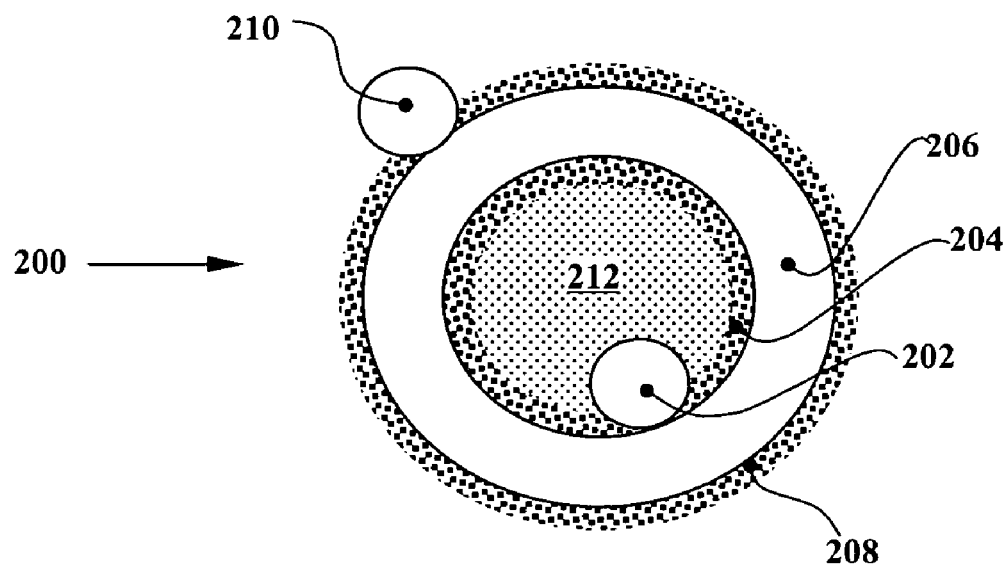
FIG. 13 shows a microfibrous fuel cell structure, which comprises a hydrogen storage material at its bore side, according to one embodiment of the present invention.

FIG. 13 shows a microfibrous fuel cell 200, according to a preferred embodiment of the present invention. The microfibrous fuel cell 200 comprises a hollow fibrous membrane separator 206, which defines a bore side and a shell side, wherein an inner current collector 202 and an inner electrocatalyst layer 204 are provided at the bore side, wherein an outer current collector 210 and an outer electrocatalyst layer 208 are provided at the shell side. The bore side of such microfibrous fuel cell 200 is further filled with a hydrogen-sorbent material 212, as described hereinabove. Such hydrogen-sorbent material dispenses hydrogen gas to the inner electrocatalyst layer 204, for generation of electrical energy.

Figure 14:
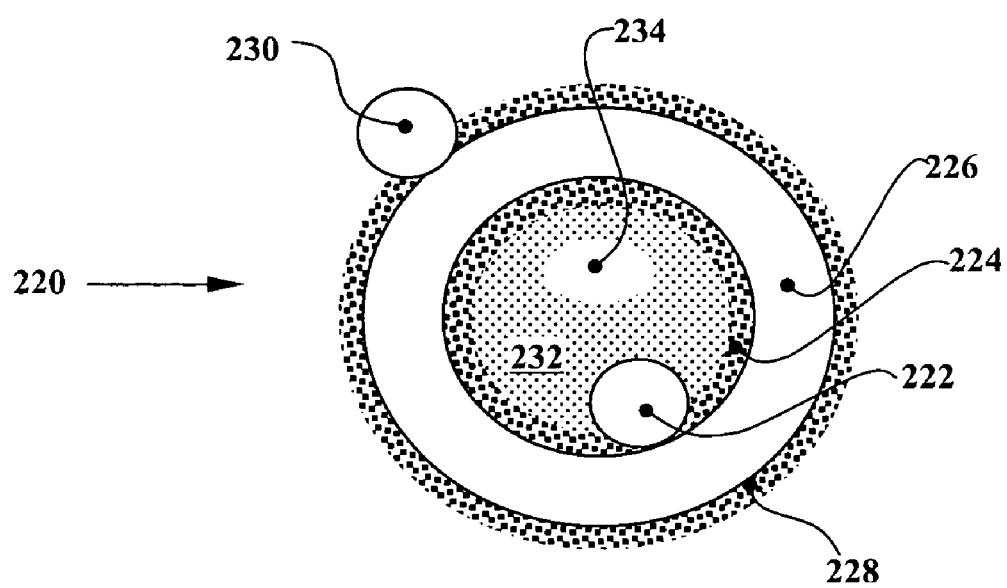
FIG. 14 shows a microfibrous fuel cell structure, containing a hydrogen storage material and a hydrogen path at its bore side, according to one embodiment of the present invention.

Exhausted hydrogen storage material can also be regenerated with hydrogen, so the microfibrous fuel cell of the present invention can be recharged and reused. FIG. 14 shows a microfibrous fuel cell 220 having a hydrogen path 234 inside the hydrogen-sorbent material 232 at the bore side thereof, through which hydrogen gas can be passed to regenerate the hydrogen-sorbent material 232.

Preferably, the hydrogen-sorbent material is confined within the hollow fibrous membrane separator by a specific boundary, i.e., being enclosed by a gas-permeable skin, so as to prevent such hydrogen-sorbent material from contacting and contaminating the inner electrocatalyst layer, while still allowing hydrogen gas to diffuse therethrough.

A hydrogen supply structure comprising a tubular wall made of a microporous polymeric material that is permeable to hydrogen gas, for enclosing a hydrogen-sorbent material therein, is particularly preferred by the present invention. Suitable microporous polymeric materials include, but are not limited to, polyolefins, polysulfones, polyvinyl chloride, polyvinyl fluoride, polytetrafluoroethylenepoly-propylene copolymer, polyamides, polyphenylene oxidi-polystyrenes and polycarbonates. Preferably, such microporous polymeric materials comprises polypropylene provided by Celgard Inc. at Charlotte, N.C.

Figure 15A:
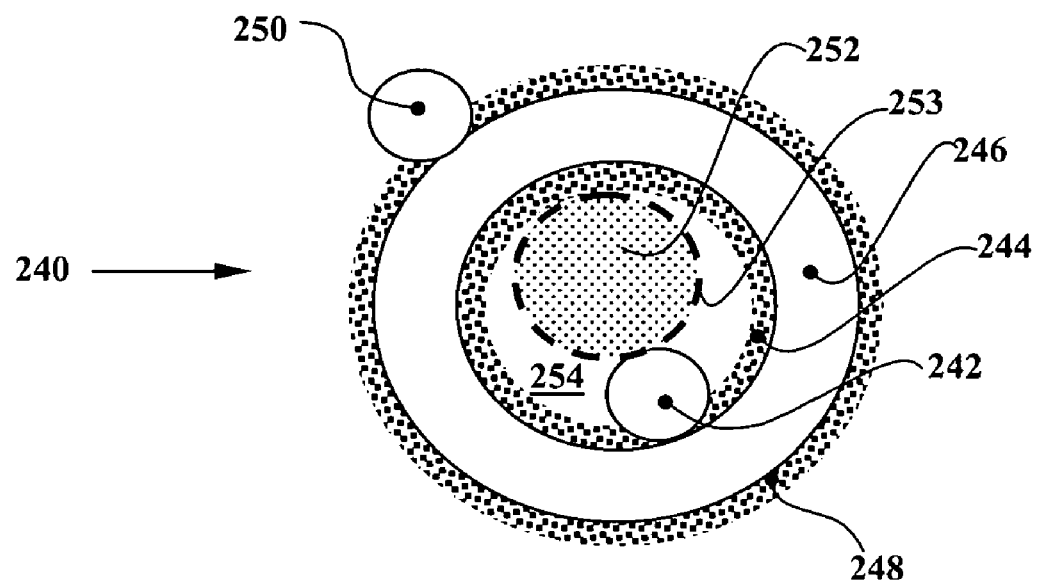
FIGS. 15A and 15B show a microfibrous fuel cell structure, which contains a hydrogen storage structure having emergency shut-down and self-isolation capacity, according to one embodiment of the present invention.

FIG. 15A shows a microfibrous fuel cell 240 with a hydrogen supply structure, as described hereinabove. Such hydrogen supply structure comprises a porous tubular wall 253 containing a meltable polymeric membrane material, preferably polypropylene, and a hydrogen-sorbent material 252 enclosed by such microporous tubular wall. It is placed side by side with the inner current collector 242 at the bore side of the hollow fibrous membrane separator 246. The microporous tubular wall 253 is permeable to hydrogen gas, which can diffuse into and out of the hydrogen storage structure therethrough. Additional space 254 is left empty at the bore side of the membrane separator 246, so that hydrogen gas can be passed therethrough for regenerating the exhausted catalyst material 252.

Figure 15B:
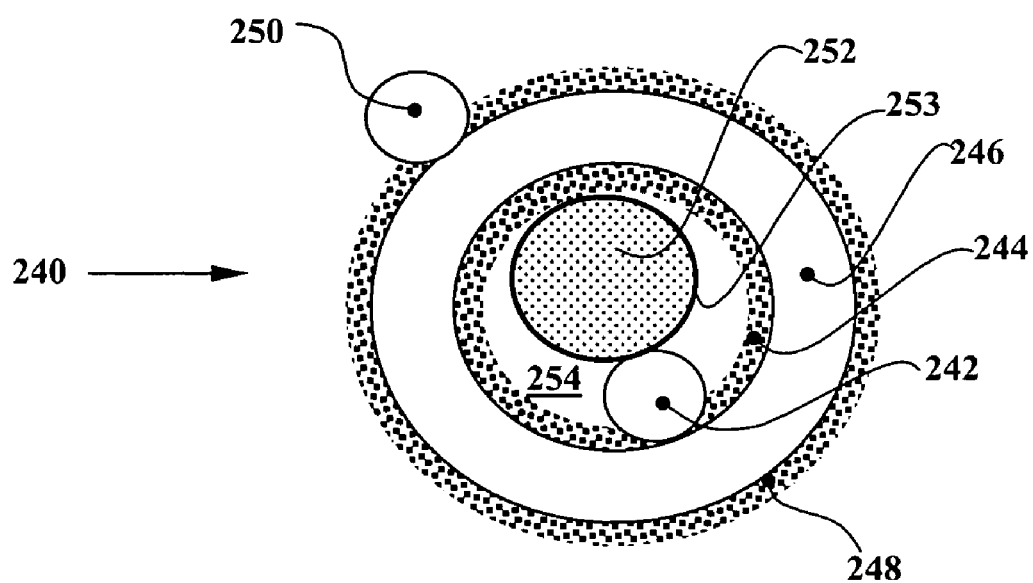

An advantage of encapsulating and enclosing the hydrogen-sorbent material within a porous polymeric tubular membrane is the containment of hydrogen release in case of a cell fire. In such instances, the high temperature will melt such polymeric tubular membrane 253 and collapse the porous structure, preventing further diffusion of oxygen to the hydrogen-sorbent material, as shown in FIG. 15B.

The hydrogen carrier material for supplying the hydrogen gas to the microfibrous fuel cell can also comprise a liquid hydrogen carrier, such as liquefied hydrogen, organic hydrogen solvents, and metal hydride solutions.

Such liquid hydrogen carrier can be encapsulated by a tubular membrane that is gas-permeable but liquid-impermeable, forming a hydrogen supply structure at the bore side of the microfibrous fuel cell. The gas-permeable and liquid-impermeable tubular membrane prevents such liquid hydrogen carrier from contacting or contaminating the inner electrocatalyst material, while allowing hydrogen to diffuse therethrough.

Figure 16:
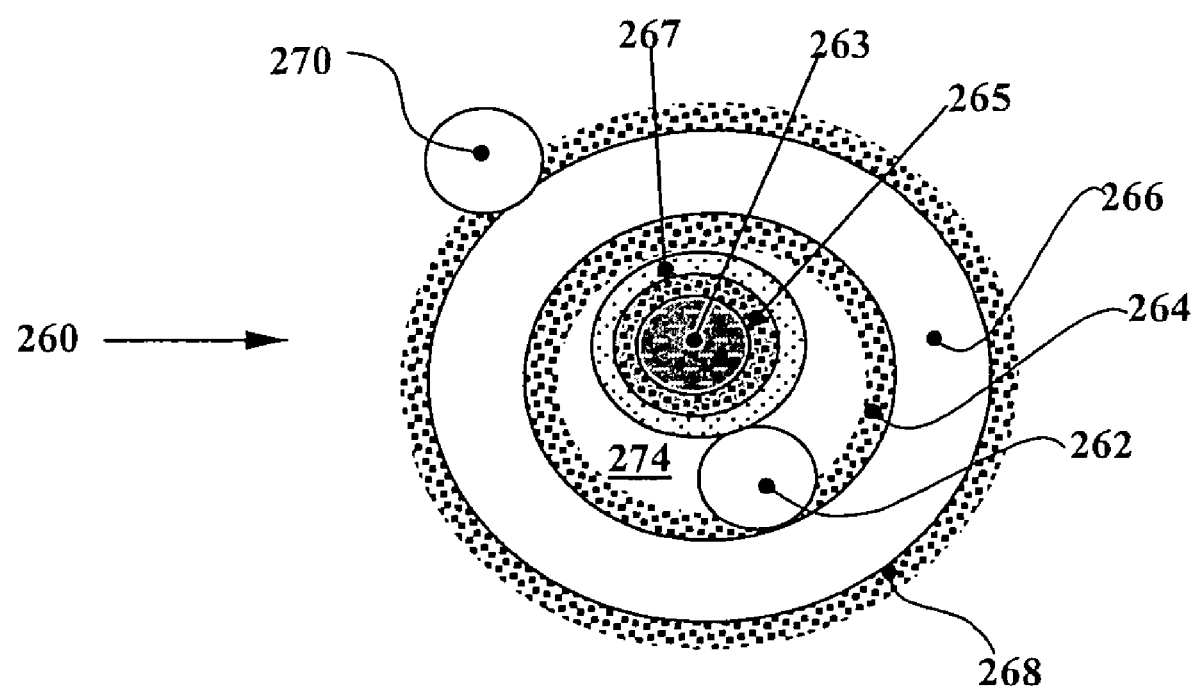
FIG. 16 shows a microfibrous fuel cell structure, which contains a hydrogen generation structure at its bore side, wherein such hydrogen generation structure comprises a microtubular element through which a borohydride solution can be passed through for hydrogen generation.

FIG. 16 shows a specific microfibrous fuel cell comprising a liquid hydrogen carrier. Microfibrous fuel cell 260 includes a hollow fibrous membrane separator 266, which defines a bore side and a shell side, wherein an inner current collector 262 and an inner electrocatalyst layer 264 are provided at the bore side, wherein an outer current collector 270 and an outer electrocatalyst layer 268 are provided at the shell side. The bore side of such microfibrous fuel cell 260 is further provided with a hydrogen supply structure comprising a metal hydride solution 263 encapsulated by a two-layer tubular membrane, which comprises an inner layer of hydrogen generation catalyst material 265 in direct contact with such metal hydride solution 263, and an outer layer of a gas-permeable and liquid-impermeable membrane material 267. In such manner, hydrogen generated by the metal hydride solution diffuses through the outer layer 267 to contact the inner electrocatalyst material layer 262, while the metal hydride solution 263 is confined inside such tubular membrane.

Further examples are provided hereinafter regarding fabrication of microfibrous fuel cell structures having hydrogen storage capacity, according to preferred embodiments of the present invention:

EXAMPLE 1

A microfibrous hydrogen storage and delivery module, which contained both the gas-permeable, liquid-impermeable hollow fibers as shown in FIG. 6A and the catalyzed microporous hollow fibers as shown in FIG. 11A, was fabricated as follows:

Hydrophobic polypropylene hollow membrane fibers were obtained from Celgard Inc. (Charlotte, N.C.). These membrane fibers exhibited 40% porosity with a 0.04 µm effective pore diameter. The internal diameter (ID) and outer diameter (OD) of the hollow fibers were 220 µm and 300 µm, respectively.

Forty-two (42) such polypropylene microporous hollow membrane fibers were bent into U-shape, placed in a ½ inch (diameter) Kynar® polyvinylidene fluoride (PVDF) tubing, and potted with epoxy at both open ends to produce a module similar to that illustrated in FIG. 5, which had a liquid compartment and a hydrogen collection compartment that were sealed against each other by the epoxy potting. The effective length of the polypropylene microporous hollow fibers was 9 cm with a surface area of about 36 cm$^2$.

Subsequently, four (4) 7 cm-long ultrafiltration polysulfone hollow membrane fibers having a 500,000 MW cut-off, an ID of about 500 µm and an OD of about 900 µm were obtained from A/G Technology Corporation (Needham, Mass.). Such ultrafiltration polysulfone hollow member fibers were first immersed in ruthenium chloride solution (5 mM) for several minutes and then dipped into sodium borohydride solution (0.1 M) solution to reduce the ruthenium into its metal form. This process was repeated several times to deposit a sufficient amount of Ru catalyst in the micropores of the hollow membrane fibers. The Ru-catalyzed hollow membrane fibers were then placed inside the liquid compartment of the module that contained the potted polypropylene hollow membrane fibers.

EXAMPLE 2

6 cc of aqueous $NaBH_4$ solution containing 30% $NaBH_4$ (by weight) and 3% NaOH (by weight) was filled into the liquid compartment of a hydrogen storage module similar to that described in EXAMPLE 1, except that no catalyzed hollow fibers were employed. The aqueous $NaBH_4$ solution contacted the shell sides of the polypropylene hollow membrane fibers and was isolated from the hydrogen collection compartment by the epoxy potting. This hydrogen storage module was further equipped with a pressure gauge for monitoring the pressure therein. After several days, no apparent pressure change was observed, indicating that high concentration $NaBH_4$ solution (30%) was stable under the presence of NaOH (3%).

EXAMPLE 3

Hydrogen delivery rates of the storage modules as manufactured in EXAMPLE 1 were measured. 5 g of an aqueous $NaBH_4$ solution (30 wt. % $NaBH_4$ and 3 wt. % NaOH) was filled into the liquid compartment of such storage module in contact with the shell sides of the polypropylene hollow membrane fibers and isolated from the hydrogen collection compartment by the epoxy potting. The hydrogen flow rates were measured under ambient pressure from the hydrogen outlet connected to the hydrogen collection compartment of the storage module. Before the Ru-catalyzed hollow fibers were inserted into such storage module, no detectable hydrogen flow was observed. After insertion of the Ru-catalyzed hollow fibers, a steady hydrogen flow of 2 cc(STP)/min was measured. The hydrophobic polypropylene hollow membrane fibers provided a liquid barrier at the vapor/liquid interface and allowed only hydrogen gas to flow to the hydrogen collection compartment through the hydrophobic membranes. Results showed that hydrogen could be generated and delivered from a lightweight, compact, and portable device under the presence of a suitable catalyst, according to this invention.

EXAMPLE 4

In this example, the hydrogen gas generated by the hydrogen storage module of Example 3 was flowed into the bore side of a microfibrous Microcell fuel cell with an ID of about 500 microns and an OD of about 750 microns, at a flow rate of 2 cc(STP)/min.

The Microcell fuel cell had Pt/Ru catalyst at its bore side and Pt catalyst at its shell side, with an active length of about 15 cm and a surface area of about 3.5 cm$^2$. The fuel cell was operated at room temperature and under atmospheric pressure. Hydrogen gas was supplied to its bore side (anode) from the hydrogen storage module, and air was provided at its shell side (cathode) via natural convection or breathing.

The performance of such microfibrous fuel cell is shown as follows:

| Current (mA/cm$^2$) | Voltage (V) |
| --- | --- |
| 0 | 1.04 |
| 10 | 0.78 |
| 20 | 0.76 |

The Microcell fuel cell operated steadily for several hours at 0.76 V with the hydrogen gas supplied by the hydrogen storage module described hereinabove, regardless of orientation of the storage module.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:

1. A storage and dispensing system for storing and dispensing a target gas, comprising:
    (a) a housing for containment of carrier material for the target gas, said housing comprising a gas collection compartment and a gas storage compartment, and being adapted to hold a volume of said carrier material in isolation from an exterior environment of the housing;
    (b) a plurality of microtubular elements disposed in said housing i) having an outer diameter in a range of from 10 micrometers to 1 millimeter, ii) one or more open ends in fluid communication with either the gas collection compartment or the gas storage compartment and iii) extending from said compartment with which it is in fluid communication and into the other compartment, wherein each of said microtubular elements comprises a tubular wall defining a bore side and a shell side, and wherein the bore side of each of said microtubular elements is sealed from the shell side thereof;
    (c) a seal which, together with the tubular walls, sealingly isolates the gas collection compartment from the gas storage compartment; and
    (d) a carrier material for storing said target gas, wherein said carrier material is disposed in said gas storage compartment and stored in said housing in isolation from the exterior environment of said housing, and wherein the gas storage compartment is at either the bore sides or the shell sides of said microtubular elements.

2. The storage and dispensing system of claim 1, wherein the carrier material for said target gas is disposed at the bore sides of said microtubular elements.

3. The storage and dispensing system of claim 2, wherein the carrier material for said target gas comprises at least one sorbent material having sorptive affinity for the target gas.

4. The storage and dispensing system of claim 3, wherein said sorbent material comprises a physical sorbent and/or a chemisorbent.

5. The storage and dispensing system of claim 3, wherein the target gas comprises hydrogen, and wherein the sorbent material comprises at least one hydrogen-sorbent.

6. The storage and dispensing system of claim 5, wherein said at least one hydrogen-sorbent comprises a material selected from the group consisting of metal hydride alloys, carbonaceous materials, zeolites, silica gels, amorphous metal compositions, and molecular sieves.

7. The storage and dispensing system of claim 2, wherein the tubular walls of said microtubular elements are not permeable to the target gas.

8. The storage and dispensing system of claim 2, wherein the carrier material for said target gas comprises a liquid carrier material.

9. The storage and dispensing system of claim 8, wherein the target gas comprises hydrogen, and wherein the liquid carrier material comprises at least one material selected from the group consisting of liquefied hydrogen, organic hydrogen solvents, and metal hydride solutions.

10. The storage and dispensing system of claim 1, wherein the carrier material for said target gas is disposed at the shell sides of said microtubular elements.

11. The storage and dispensing system of claim 10, wherein the carrier material comprises at least one sorbent material having sorptive affinity for the target gas.

12. The storage and dispensing system of claim 11, wherein said at least one sorbent material comprises a physical sorbent and/or a chemisorbent.

13. The storage and dispensing system of claim 11, wherein the target gas comprises hydrogen, and wherein the sorbent material comprises at least one hydrogen-sorbent.

14. The storage and dispensing system of claim 13, wherein said at least one hydrogen-sorbent comprises a material selected from the group consisting of metal hydride alloys, carbonaceous materials, zeolites, silica gels, amorphous metal compositions, and molecular sieves.

15. The storage and dispensing system of claim 10, wherein the carrier material for said target gas comprises a liquid carrier material.

16. The storage and dispensing system of claim 15, wherein the target gas comprises hydrogen, and wherein the liquid carrier material comprises at least one material selected from the group consisting of liquefied hydrogen, organic hydrogen solvents, and metal hydride solutions.

17. The storage and dispensing system of claim 16, wherein the seal comprises one or more potting members at or proximate to the one or more open ends of said microtubular elements on the bore sides of said microtubular elements, and providing a leak-tight seal, wherein said one or more potting members, said tubular walls, and said housing define: (1) at least one liquid compartment for holding said liquid carrier material, and (2) at least one hydrogen collection compartment separated from said liquid compartment in a leak-tight manner, wherein said microtubular elements extend from said liquid compartment to said hydrogen collection compartment, so that the shell sides of said microtubular elements at least partially contact the liquid carrier material in the liquid compartment, and that the bore sides of said microtubular elements are in fluid communication with said hydrogen collection compartment, and wherein the housing comprises at least one hydrogen outlet connected to said hydrogen collection compartment for dispensing hydrogen gas therefrom.

18. The storage and dispensing system of claim 17, wherein the tubular walls of the microtubular elements comprise a membrane material that is gas-permeable but liquid-impermeable.

19. The storage and dispensing system of claim 18, wherein said membrane material comprises a microporous, hydrophobic polymeric material.

20. The storage and dispensing system of claim 17, wherein the tubular walls of the microtubular elements comprises a first layer of structural material that is gas- and liquid-permeable, and a second layer of membrane material that is gas-permeable but liquid-impermeable.

21. The storage and dispensing system of claim 17, wherein the liquid carrier material comprises at least one metal hydride solution.

22. The storage and dispensing system of claim 21, wherein the metal hydride solution comprises NaBH4.

23. The storage and dispensing system of claim 22, wherein the metal hydride solution comprises NaBH4 at a concentration in a range of from about 10% to about 35% by total weight of said solution, and wherein the metal hydride solution further comprises sodium hydroxide at a concentration in a range of from about 2% to about 4% by total weight of said solution.

24. The storage and dispensing system of claim 21, further comprising a catalyst-based hydrogen release control mechanism associated with the liquid compartment.

25. The storage and dispensing system of claim 21, further comprising a pH-based hydrogen release control mechanism associated with the liquid compartment.

26. The storage and dispensing system of claim 21, further comprising a water supply for controllably adding water to the liquid compartment.

27. The storage and dispensing system of claim 26, arranged and configured for supplying hydrogen gas to a downstream hydrogen fuel cell assembly for generation of electrical energy, wherein said hydrogen fuel cell assembly comprises a water management mechanism for removing water generated during the electrochemical reaction from said assembly, and wherein the water supply of said storage and dispensing system is connected to the water management mechanism of the hydrogen fuel cell assembly, so that the water generated by said hydrogen fuel cell assembly is controllably added to the liquid compartment of the storage and dispensing system.

28. The storage and dispensing system of claim 21, wherein each of the tubular walls of said microtubular elements comprises a first layer of a catalyst material, a second layer of a membrane material that is gas-permeable but liquid-impermeable, and a third layer of a structural material that is gas- and liquid-permeable.

29. The storage and dispensing system of claim 21, wherein the tubular wall of each microtubular element is impregnated with a catalyst material and has a coating of a membrane material that is gas-permeable but liquid-impermeable on an inner surface thereof.

30. The storage and dispensing system of claim 1 wherein the carrier is metal hydride solution that generates the target gas upon contact with a catalyst and said gas permeable microtubular wall comprises said catalyst.

31. The storage and dispensing system of claim 30 wherein the gas permeable microtubular wall is also liquid permeable and the system further comprises an inlet and an outlet for said metal hydride solution, the inlet being in fluid communication with the gas storage compartment and the outlet being in fluid communication with the gas collection compartment, whereby the target gas is generated concurrent with the passing of the metal hydride solution through the permeable microtubular wall.

* * * * *